United States Patent
Inoue et al.

(10) Patent No.: US 9,415,832 B2
(45) Date of Patent: Aug. 16, 2016

(54) BICYCLE PEDAL

(71) Applicant: SHIMANO INC., Sakai (JP)

(72) Inventors: Akira Inoue, Sakai (JP); Takuro Yamane, Sakai (JP)

(73) Assignee: SHIMANO INC., Sakai (JP)

( * ) Notice: Subject to any disclaimer, the term of this patent is extended or adjusted under 35 U.S.C. 154(b) by 29 days.

(21) Appl. No.: 14/328,629

(22) Filed: Jul. 10, 2014

(65) Prior Publication Data

US 2016/0009333 A1    Jan. 14, 2016

(51) Int. Cl.
 *B62M 3/08*    (2006.01)

(52) U.S. Cl.
 CPC .................... *B62M 3/086* (2013.01)

(58) Field of Classification Search
 CPC ........ B62M 3/08; B62M 3/083; B62M 3/086; Y10T 74/2168; Y10T 74/217
 See application file for complete search history.

(56) References Cited

U.S. PATENT DOCUMENTS

| | | | | |
|---|---|---|---|---|
| 5,685,202 A * | 11/1997 | Chen | ...... | B62M 3/086 74/594.4 |
| 6,014,914 A * | 1/2000 | Ueda | ...... | B62M 3/086 74/594.4 |
| 6,112,620 A * | 9/2000 | Chen | ...... | B62M 3/086 74/594.4 |
| 7,013,755 B2 * | 3/2006 | Muraoka | ...... | B62M 3/086 36/131 |
| 7,509,889 B2 * | 3/2009 | Chen | ...... | B62M 3/086 74/594.1 |
| 8,312,791 B2 * | 11/2012 | Inoue | ...... | B62M 3/086 36/131 |
| 8,720,305 B1 * | 5/2014 | Inoue | ...... | B62M 3/086 74/594.6 |
| 9,021,918 B2 * | 5/2015 | Inoue | ...... | B62M 3/086 74/594.6 |
| 2014/0116200 A1 | 5/2014 | Inoue | | |
| 2014/0311282 A1 * | 10/2014 | Inoue | ...... | B62M 3/086 74/594.6 |
| 2015/0197312 A1 * | 7/2015 | Hsieh | ...... | B62M 3/086 74/594.4 |

* cited by examiner

*Primary Examiner* — Adam D Rogers
(74) *Attorney, Agent, or Firm* — Mori & Ward, LLP

(57) ABSTRACT

A bicycle pedal comprises a pedal axle, a pedal body, a first sub member, a first clamping member, a second clamping member, a biasing structure, and a restricting structure. The first sub member is movable relative to the pedal body about a first pivot axis between a first position and a second position. The first clamping member is movable relative to the first sub member about a second pivot axis between a third position and a fourth position. The restricting structure is configured to restrict the first sub member from pivoting about the first pivot axis relative to the pedal body toward the second position.

26 Claims, 36 Drawing Sheets

BICYCLE PEDAL

BACKGROUND OF THE INVENTION

1. Field of the Invention

The present invention relates to a bicycle pedal.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle pedal such as a clipless pedal.

SUMMARY OF THE INVENTION

In accordance with a first aspect of the present invention, a bicycle pedal comprises a pedal axle, a pedal body, a first sub member, a first clamping member, a second clamping member, a biasing structure, and a restricting structure. The pedal body is rotatably supported on the pedal axle. The first sub member is movably coupled to the pedal body. The first sub member is movable relative to the pedal body about a first pivot axis between a first position and a second position. The first clamping member is movably coupled to the first sub member. The first clamping member is movable relative to the first sub member about a second pivot axis between a third position and a fourth position. The second clamping member is coupled to the pedal body to clamp a cleat together with the first clamping member. The biasing structure is configured to bias the first clamping member toward the third position and is configured to bias the first sub member toward the first position. The first sub member, the first pivot axis, the first clamping member, the second pivot axis and the biasing structure are configured such that a first torque to pivot the first sub member about the first pivot axis toward the second position is less than a second torque to pivot the first clamping member about the second pivot axis toward the fourth position. The restricting structure is configured to restrict the first sub member from pivoting about the first pivot axis relative to the pedal body toward the second position.

In accordance with a second aspect of the present invention, the bicycle pedal according to the first aspect further comprises a third clamping member and a fourth clamping member. The third clamping member is coupled to the pedal body and is provided on an opposite side of the first clamping member relative to the pedal body. The fourth clamping member is coupled to the pedal body to clamp a cleat together with the third clamping member. The first sub member is integrally provided with the fourth clamping member.

In accordance with a third aspect of the present invention, the bicycle pedal according to the first aspect is configured so that the first pivot axis is farther from the pedal axle than the second pivot axis.

In accordance with a fourth aspect of the present invention, the bicycle pedal according to the first aspect is configured so that the biasing structure includes a first biasing member and a second biasing member. The first biasing member is configured to bias the first clamping member relative to the pedal body toward the third position. The second biasing member is configured to bias the first clamping member relative to the first sub member toward the third position.

In accordance with a fifth aspect of the present invention, the bicycle pedal according to the fourth aspect is configured so that the first biasing member includes a first end and a second end. The first end is configured to engage with the pedal body. The second end is configured to engage with the first clamping member. The second biasing member includes a third end and a fourth end. The third end is configured to engage with the first sub member. The fourth end is configured to engage with the first clamping member.

In accordance with a sixth aspect of the present invention, the bicycle pedal according to the first aspect is configured so that the restricting structure includes a first pressed portion configured to be pressed by the cleat so that the first sub member is restricted from pivoting relative to the pedal body about the first pivot axis toward the second position.

In accordance with a seventh aspect of the present invention, the bicycle pedal according to the sixth aspect is configured so that the first pressed portion is pressed by the cleat in a state where the first clamping member and the second clamping member clamp the cleat. The first pressed portion is disposed at a position such that, in a step-in operation of the bicycle pedal, the first clamping member comes into contact with the cleat before the first pressed portion comes into contact with the cleat.

In accordance with an eighth aspect of the present invention, the bicycle pedal according to the sixth aspect is configured so that the first pressed portion is provided on the first sub member and is pivotable integrally with the first sub member about the first pivot axis.

In accordance with a ninth aspect of the present invention, the bicycle pedal according to the eighth aspect is configured so that the first pressed portion protrudes from the first sub member away from the second pivot axis.

In accordance with a tenth aspect of the present invention, the bicycle pedal according to the first aspect is configured so that the restricting structure includes a second pressed portion configured to be pressed by the cleat so that the first sub member is restricted from pivoting relative to the pedal body about the first pivot axis toward the second position.

In accordance with an eleventh aspect of the present invention, the bicycle pedal according to the tenth aspect is configured so that the second pressed portion is pressed by the cleat in a state where the first clamping member and the second clamping member clamp the cleat. The second pressed portion is disposed at a position such that, in a step-in operation of the bicycle pedal, the first clamping member comes into contact with the cleat before the second pressed portion comes into contact with the cleat.

In accordance with a twelfth aspect of the present invention, the bicycle pedal according to the tenth aspect is configured so that the second pressed portion is movable relative to the first sub member between a pressed position at which the second pressed portion is pressed by the cleat, and a rest position at which the second pressed portion is not pressed by the cleat. The restricting structure restricts the first sub member from pivoting relative to the pedal body about the first pivot axis toward the second position in a state where the second pressed portion is disposed at the second pressed position. The restricting structure allows the first sub member to pivot relative to the pedal body about the first pivot axis toward the second position in a state where the second pressed portion is disposed at the rest position.

In accordance with a thirteenth aspect of the present invention, the bicycle pedal according to the twelfth aspect is configured so that the biasing structure includes a third biasing member configured to bias the second pressed portion to the rest position.

In accordance with a fourteenth aspect of the present invention, the bicycle pedal according to the twelfth aspect is configured so that the second pressed portion is pivotable relative to the first sub member about an additional pivot axis between the pressed position and the rest position.

In accordance with a fifteenth aspect of the present invention, the bicycle pedal according to the fourteenth aspect is configured so that the additional pivot axis coincides with the second pivot axis.

In accordance with a sixteenth aspect of the present invention, the bicycle pedal according to the fourteenth aspect is configured so that the restricting structure includes a first restricting part and a second restricting part. The first restricting part is pivotable integrally with the second pressed portion relative to the first sub member about the additional pivot axis between a restricting position and a release position. The second restricting part is integrally provided with the pedal body. The first restricting part is contactable with the second restricting part to restrict the first sub member from pivoting relative to the pedal body about the first pivot axis in a state where the first restricting part is disposed at the restricting position. The first restricting part is spaced apart from the second restricting part to allow the first sub member to pivot relative to the pedal body about the first pivot axis in a state where the first restricting part is disposed at the release position.

In accordance with a seventeenth aspect of the present invention, the bicycle pedal according to the first aspect is configured so that the first sub member is pivotable relative to the pedal body about the first pivot axis in a pivot direction. The first sub member is movable relative to the pedal body in a movement direction between an engaging position and a disengaging position, the movement direction being different from the pivot direction. The restricting structure restricts the first sub member from pivoting relative to the pedal body about the first pivot axis in a state where the first sub member is disposed at the engaging position. The restricting structure allows the first sub member to pivot relative to the pedal body about the first pivot axis in a state where the first sub member is disposed at the disengaging position.

In accordance with an eighteenth aspect of the present invention, the bicycle pedal according to the seventeenth aspect is configured so that the restricting structure includes a first restricting part and a second restricting part. The first restricting part is provided on the first sub member to be movable integrally with the first sub member relative to the pedal body in the movement direction. The second restricting part is integrally provided with the pedal body. The first restricting part is configured to engage with the second restricting part to restrict the first sub member from pivoting relative to the pedal body about the first pivot axis in the state where the first sub member is disposed at the engaging position. The first restricting part is configured to disengage from the second restricting part to allow the first sub member to pivot relative to the pedal body about the first pivot axis in the state where the first sub member is disposed at the disengaging position.

In accordance with a nineteenth aspect of the present invention, the bicycle pedal according to the seventeenth aspect is configured so that the biasing structure is configured to bias the first sub member toward the engaging position.

In accordance with a twentieth aspect of the present invention, the bicycle pedal according to the seventeenth aspect is configured so that the first sub member is movable relative to the pedal body toward the disengaging position in the movement direction in response to an actuating force applied to the first clamping member in a step-in operation of the bicycle pedal.

In accordance with a twenty-first aspect of the present invention, the bicycle pedal according to the seventeenth aspect further comprises a first pivot shaft configured to pivotably support the first sub member about the first pivot axis. The first sub member includes an elongated hole through which the first pivot shaft extends. The first pivot shaft is configured to guide the first sub member via the elongated hole to move relative to the pedal body in the movement direction.

In accordance with a twenty-second aspect of the present invention, the bicycle pedal according to the twenty-first aspect is configured so that the movement direction is perpendicular to the first pivot axis.

In accordance with a twenty-third aspect of the present invention, the bicycle pedal according to the twenty-first aspect is configured so that the movement direction is inclined relative to a cleat attachment plane defined by the first clamping member and the second clamping member.

In accordance with a twenty-fourth aspect of the present invention, the bicycle pedal according to the twenty-third aspect is configured so that the first sub member is configured to move rearward and downward relative to the pedal body in response to an actuating force applied to the first clamping member in a step-in operation of the bicycle pedal.

In accordance with a twenty-fifth aspect of the present invention, the bicycle pedal according to the first aspect is configured so that the restricting structure is configured to restrict the first sub member from moving from a restricted position toward the second position.

In accordance with a twenty-sixth aspect of the present invention, a bicycle pedal comprises a pedal axle, a pedal body, a first sub member, a first clamping member, a second clamping member, and a biasing structure. The pedal body is rotatably supported on the pedal axle. The first sub member is movably coupled to the pedal body. The first sub member is movable relative to the pedal body about a first pivot axis between a first position and a second position. The first clamping member is movably coupled to the first sub member. The first clamping member is movable relative to the first sub member about a second pivot axis between a third position and a fourth position. The first clamping member is movable relative to the pedal body about the first pivot axis between a fifth position and a sixth position. The second clamping member is coupled to the pedal body to clamp a cleat together with the first clamping member. The biasing structure is configured to bias the first clamping member toward the third position and is configured to bias the first sub member toward the first position. The first sub member, the first pivot axis, the first clamping member, the second pivot axis and the biasing structure are configured such that a first torque to pivot the first sub member about the first pivot axis toward the second position is less than a second torque to pivot the first clamping member about second pivot axis toward the fourth position. The first clamping member is configured to pivot relative to the pedal body toward the sixth position about only the first pivot axis during a step-in operation of the bicycle pedal, and is configured to pivot relative to the first sub member toward the fourth position about only the second pivot axis during a step-out operation of the bicycle pedal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
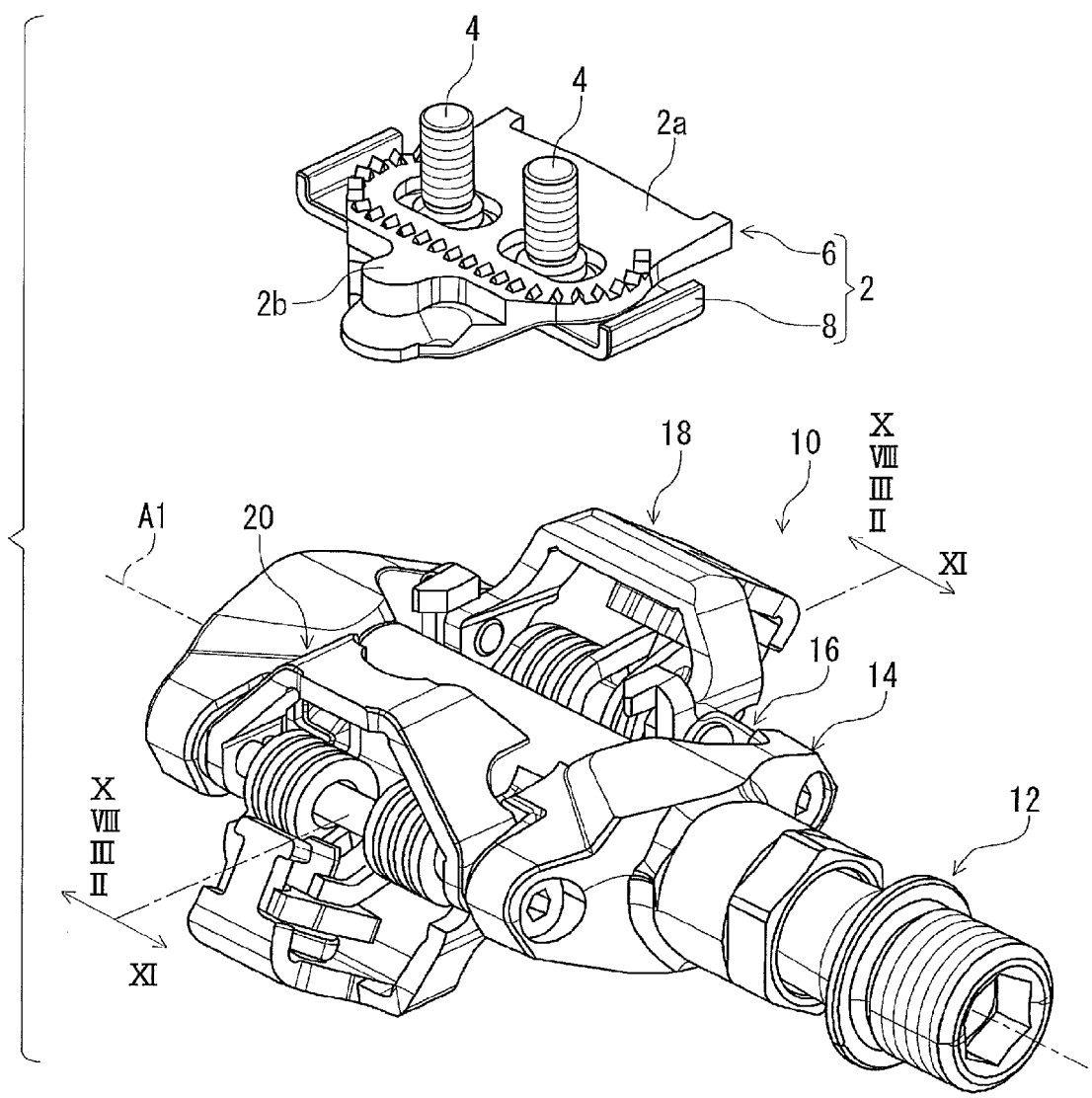
FIG. 1 is a perspective view of a bicycle pedal in accordance with a first embodiment, with a cleat.

The embodiments will now be described with reference to the accompanying drawings, wherein like reference numerals designate corresponding or identical elements throughout the various drawings.

First Embodiment

Referring initially to FIG. 1, a bicycle pedal 10 in accordance with the first embodiment comprises a pedal axle 12, a pedal body 14, a first sub member 16, a first clamping member 18, and a second clamping member 20. The pedal axle 12 is configured to be secured to a crank arm (not shown). The pedal body 14 is rotatably supported on the pedal axle 12. The pedal body 14 is rotatable relative to the pedal axle 12 about a rotational axis A1. The first sub member 16 is movably coupled to the pedal body 14. The first clamping member 18 is movably coupled to the first sub member 16. In the illustrated embodiment, the first sub member 16 is pivotably coupled to the pedal body 14. The first clamping member 18 is pivotably coupled to the first sub member 16. The second clamping member 20 is coupled to the pedal body 14 to clamp a cleat 2 together with the first clamping member 18. The cleat 2 is attached to a sole of a shoe (not shown) using bolts 4. The cleat 2 includes a cleat body 6 and an attachment plate 8.

In the illustrated embodiment, the first clamping member 18 is a rear clamping member configured to engage with a rear end 2a of the cleat 2. The second clamping member 20 is a front clamping member configured to engage with a front end 2b of the cleat 2. However, the first clamping member 18 can be a front clamping member, and the second clamping member 20 can be a rear clamping member if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar (not shown). Accordingly, these terms, as utilized to describe the bicycle pedal 10, should be interpreted relative to the bicycle equipped with the bicycle pedal 10 as used in an upright riding position on a horizontal surface.

Figure 2:
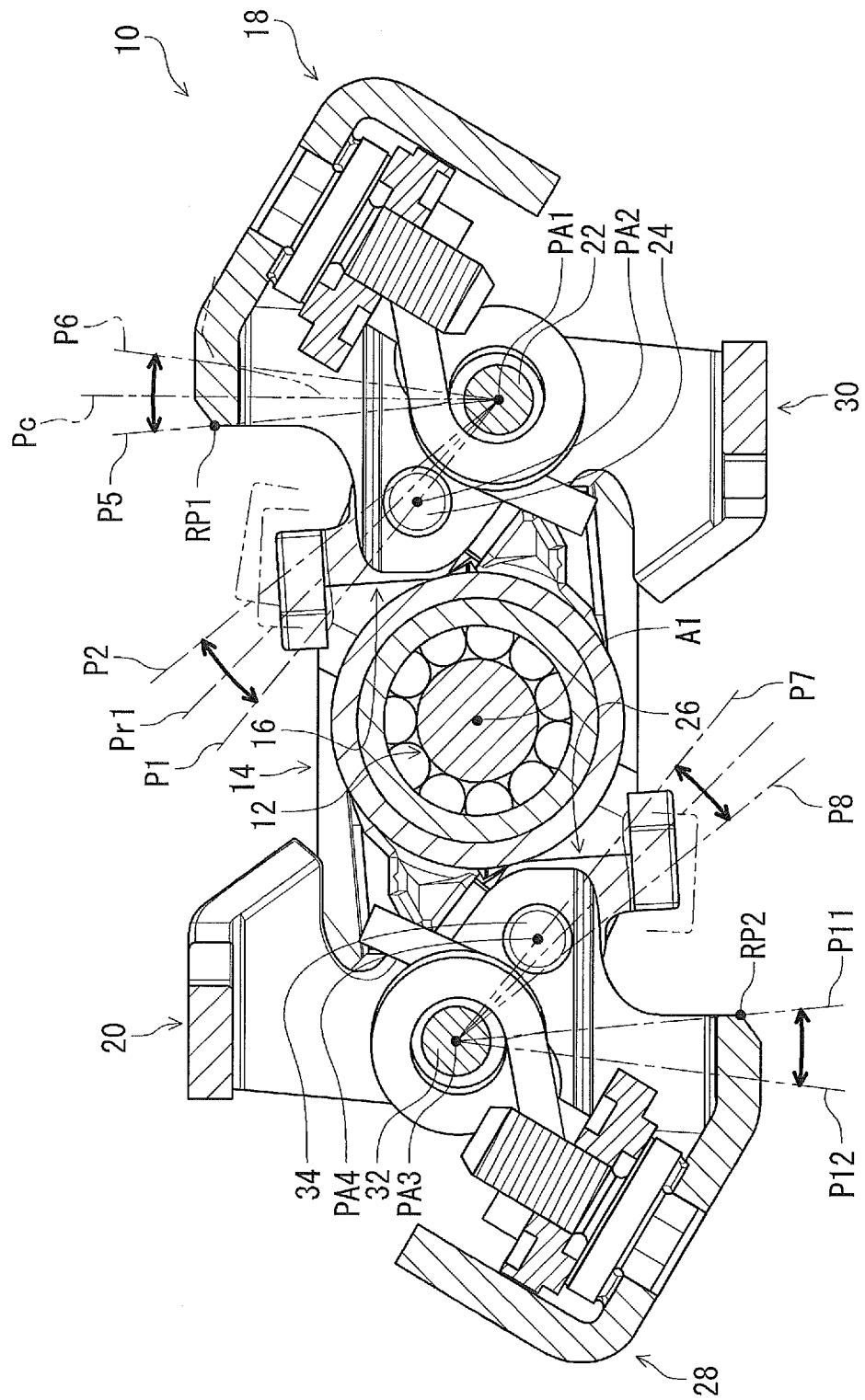
FIG. 2 is a cross-sectional view of the bicycle pedal taken along line II-II of FIG. 1.

As seen in FIG. 2, the first sub member 16 is movable relative to the pedal body 14 about a first pivot axis PA1 between a first position P1 and a second position P2. In the illustrated embodiment, the first sub member 16 is pivotable relative to the pedal body 14 about the first pivot axis PA1 between the first position P1 and the second position P2. The first sub member 16 is positioned at the first position P1 in a state where the cleat 2 (FIG. 1) is released from the bicycle pedal 10.

Figure 3:
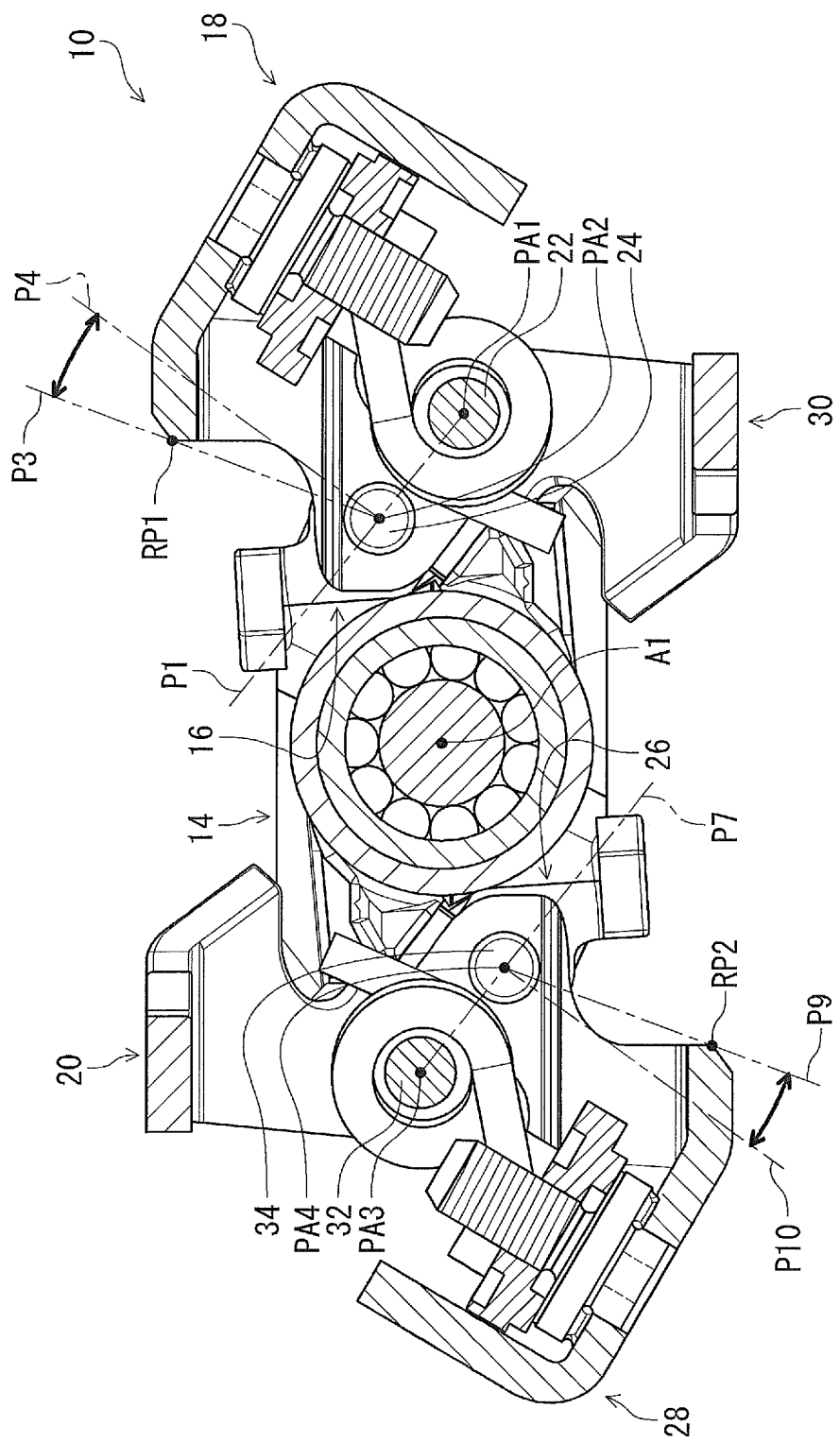
FIG. 3 is a cross-sectional view of the bicycle pedal taken along line of FIG. 1.

As seen in FIG. 3, the first clamping member 18 is movable relative to the first sub member 16 about a second pivot axis PA2 between a third position P3 and a fourth position P4. In the illustrated embodiment, the first clamping member 18 is pivotable relative to the first sub member 16 about the second pivot axis PA2 between the third position P3 and the fourth position P4. The first clamping member 18 is positioned at the third position P3 in a state where the cleat 2 (FIG. 1) is released from the bicycle pedal 10.

In the illustrated embodiment, as seen in FIG. 3, the third position P3 and the fourth position P4 of the first clamping member 18 are defined based on the second pivot axis PA2 and a reference point RP1. As seen in FIG. 2, the first position P1 and the second position P2 of the first sub member 16 are defined based on the first, pivot axis PA1 and the second pivot axis PA2.

As seen in FIG. 2, the first clamping member 18 is pivotable together with the first sub member 16 relative to the pedal body 14 about the first pivot axis PA1. In the illustrated embodiment, the first clamping member 18 is pivotable together with the first sub member 16 relative to the pedal body 14 about the first pivot axis PA1 between a fifth position P5 and a sixth position P6. The first clamping member 18 pivots relative to the pedal body 14 about the first pivot axis PA1 between the fifth position P5 and the sixth position P6 in a state where the first clamping member 18 is positioned at the third position P3 relative to the first sub member 16 (FIG. 3). The fifth position P5 of the first clamping member 18 corresponds to the first position P1 of the first sub member 16. The sixth position P6 of the first clamping member 18 corresponds to the second position P2 of the first sub member 16.

The cleat 2 is clamped by the first clamping member 18 in a state where the first clamping member 18 is disposed at a clamping position Pc and in a state where the sub member 16 is disposed at a restricted position Pr1. The clamping position Pc is defined between the fifth position P5 and the sixth position P6. The restricted position Pr1 is defined between the first position P1 and the second position P2. Further, the cleat 2 can be detached (disengaged) from the first clamping member 18 in a state where the first clamping member 18 is disposed at the fourth position P4 or the sixth position P6 and in a state where the sub member 16 is disposed at the second position P2.

Figure 4:
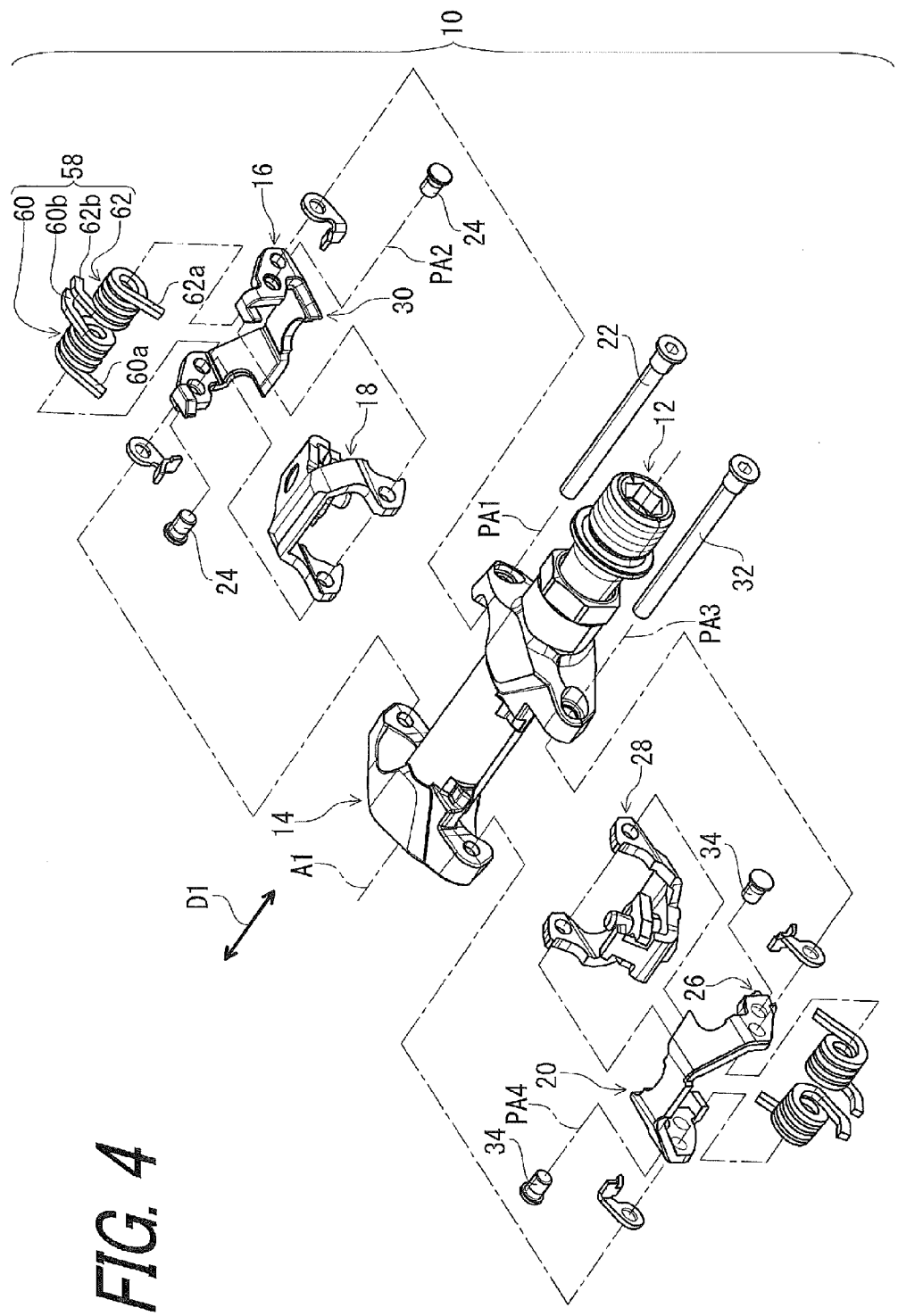
FIG. 4 is an exploded perspective view of the bicycle pedal illustrated in FIG. 1.

As seen in FIG. 4, the bicycle pedal 10 further comprises a first pivot shaft 22. The first pivot shaft 22 is configured to pivotably support the first sub member 16 about the first pivot axis PA1. The first pivot shaft 22 is attached to the pedal body 14. The first sub member 16 is pivotably coupled to the pedal body 14 about the first pivot axis PA1 by the first pivot shaft 22. The first pivot axis PA1 is parallel to the rotational axis A1 of the pedal body 14. As seen in FIG. 2, the first pivot axis PA1 is defined as a center axis of the first pivot shaft 22.

As seen in FIG. 4, the bicycle pedal 10 further comprises second pivot shafts 24. The second pivot shafts 24 are configured to pivotably support the first clamping member 18 about the second pivot axis PA2. The second pivot shafts 24 are attached to the first sub member 16. The first clamping member 18 is pivotably coupled to the first sub member 16 about the second pivot axis PA2 by the second pivot shafts 24. The second pivot axis PA2 is parallel to the rotational axis A1 of the pedal body 14. As seen FIG. 2, the second pivot axis PA2 is defined as center axes of the second pivot shafts 24.

In the illustrated embodiment, as seen in FIG. 2, the bicycle pedal 10 is a two-sided pedal (e.g., mounting bicycle style). More specifically, the bicycle pedal 10 further comprises a second sub member 26, a third clamping member 28, and a fourth clamping member 30. The second sub member 26 corresponds to the first sub member 16. The third clamping member 28 corresponds to the first clamping member 18. The fourth clamping member 30 corresponds to the second clamping member 20.

The third clamping member 28 is a rear clamping member configured to engage with the rear end 2a of the cleat 2 (FIG. 1) as well as the first clamping member 18. The fourth clamping member 30 is a front clamping member configured to engage with the front end 2b of the cleat 2 (FIG. 1) as well as the second clamping member 20. However, the third clamping member 28 can be a front clamping member, and the fourth clamping member 30 can be a rear clamping member if needed and/or desired.

In the illustrated embodiment, the second sub member 26 has the same structure as the structure of the first sub member 16. The third clamping member 28 has the same structure as the structure of the first clamping member 18. The fourth clamping member 30 has the same structure as the structure of the second clamping member 20. The second sub member 26 can, however, have a different structure from the structure of the first sub member 16. The third clamping member 28 can have a different structure from the structure of the first clamping member 18. The fourth clamping member 30 can have a different structure from the structure of the second clamping member 20.

The second sub member 26, the third clamping member 28, and the fourth clamping member 30 have the same structures as the structures of the first sub member 16, the first clamping member 18, and the second clamping member 20. Accordingly, elements having substantially the same function as those in the first embodiment will be numbered the same here, and will not be described and/or illustrated in detail here for the sake of brevity.

In a case where the bicycle pedal 10 is a one-sided pedal (e.g., road style), at least one of the second sub member 26, the third clamping member 28, and the fourth clamping member 30 can be omitted from the bicycle pedal 10.

As seen in FIG. 2, the second sub member 26 is pivotably coupled to the pedal body 14. The third clamping member 28 is coupled to the pedal body 14. More specifically, the third clamping member 28 is pivotably coupled to the second sub member 26. The third clamping member 28 is provided on an opposite side of the first clamping member 18 relative to the pedal body 14 (the rotational axis A1). The fourth clamping member 30 is coupled to the pedal body 14 to clamp the cleat 2 (FIG. 1) together with the third clamping member 28. More specifically, the fourth clamping member 30 is pivotably coupled to the pedal body 14. The fourth clamping member 30 is provided on an opposite side of the second clamping member 20 relative to the pedal body 14 (the rotational axis A1).

As seen in FIG. 2, the second sub member 26 is pivotable relative to the pedal body 14 about a third pivot axis PA3 between a seventh position P7 and an eighth position P8. The second sub member 26 is positioned at the seventh position P7 in a state where the cleat 2 (FIG. 1) is released from the bicycle pedal 10.

As seen in FIG. 3, the third clamping member 28 is pivotable relative to the second sub member 26 about a fourth pivot axis PA4 between a ninth position P9 and a tenth position P10. In the illustrated embodiment, the third clamping member 28 is positioned at the ninth position P9 in a state where the cleat 2 (FIG. 1) is released from the bicycle pedal 10.

In the illustrated embodiment, as seen in FIG. 3, the ninth position P9 and the tenth position P10 of the third clamping member 28 are defined based on the fourth pivot axis PA4 and a reference point RP2. As seen in FIG. 2, the seventh position P7 and the eighth position P8 of the second sub member 26 are defined based on the third pivot axis PA3 and the fourth pivot axis PA4.

As seen in FIG. 2, the third clamping member 28 is pivotable together with the second sub member 26 relative to the pedal body 14 about the third pivot axis PA3. In the illustrated embodiment, the third clamping member 28 is pivotable together with the second sub member 26 relative to the pedal body 14 about the third pivot axis PA3 between an eleventh position P11 and a twelfth position P12. The third clamping member 28 pivots relative to the pedal body 14 about the third pivot axis PA3 between the eleventh position P11 and the twelfth position P12 in a state where the third clamping member 28 is positioned at the ninth position P9 relative to the second sub member 26 (FIG. 3). The eleventh position P11 of the third clamping member 28 corresponds to the seventh position P7 of the second sub member 26. The twelfth position P12 of the third clamping member 28 corresponds to the eighth position P8 of the second sub member 26.

As seen in FIG. 4, the bicycle pedal 10 further comprises a third pivot shaft 32. The third pivot shaft 32 is configured to pivotably support the second sub member 26 about the third pivot axis PA3. The third pivot shaft 32 is attached to the pedal body 14. The second sub member 26 is pivotably coupled to the pedal body 14 about the third pivot axis PA3 by the third pivot shaft 32. The third pivot axis PA3 is parallel to the rotational axis A1 of the pedal body 14. As seen in FIG. 2, the third pivot axis PA3 is defined as a center axis of the third pivot shaft 32. The third pivot shaft 32 corresponds to the first pivot shaft 22.

As seen in FIG. 4, the bicycle pedal 10 further comprises fourth pivot shafts 34. The fourth pivot shafts 34 are configured to pivotably support the third clamping member 28 about the fourth pivot axis PA4. The fourth pivot shafts 34 are attached to the second sub member 26. The third clamping member 28 is pivotably coupled to the second sub member 26 about the fourth pivot axis PA4 by the fourth pivot shafts 34. The fourth pivot axis PA4 is parallel to the rotational axis A1 of the pedal body 14. As seen FIG. 2, the fourth pivot axis PA4 is defined as center axes of the fourth pivot shafts 34. The fourth pivot shafts 34 correspond to the second pivot shafts 24.

As seen in FIG. 4, the first sub member 16 is integrally provided with the fourth clamping member 30. In the illustrated embodiment, the first sub member 16 is integrally provided with the fourth clamping member 30 as a single unitary member. The fourth clamping member 30 is pivotable relative to the pedal body 14 about the first pivot axis PA1 together with the first sub member 16. The first sub member 16 can, however, be a separate member from the fourth clamping member 30.

Similarly, the second sub member 26 is integrally provided with the second clamping member 20. In the illustrated embodiment, the second sub member 26 is integrally provided with the second clamping member 20 as a single unitary member. The second clamping member 20 is pivotable relative to the pedal body 14 about the third pivot axis PA3 together with the second sub member 26. The second sub member 26 can, however, be a separate member from the second clamping member 20.

Figure 5:
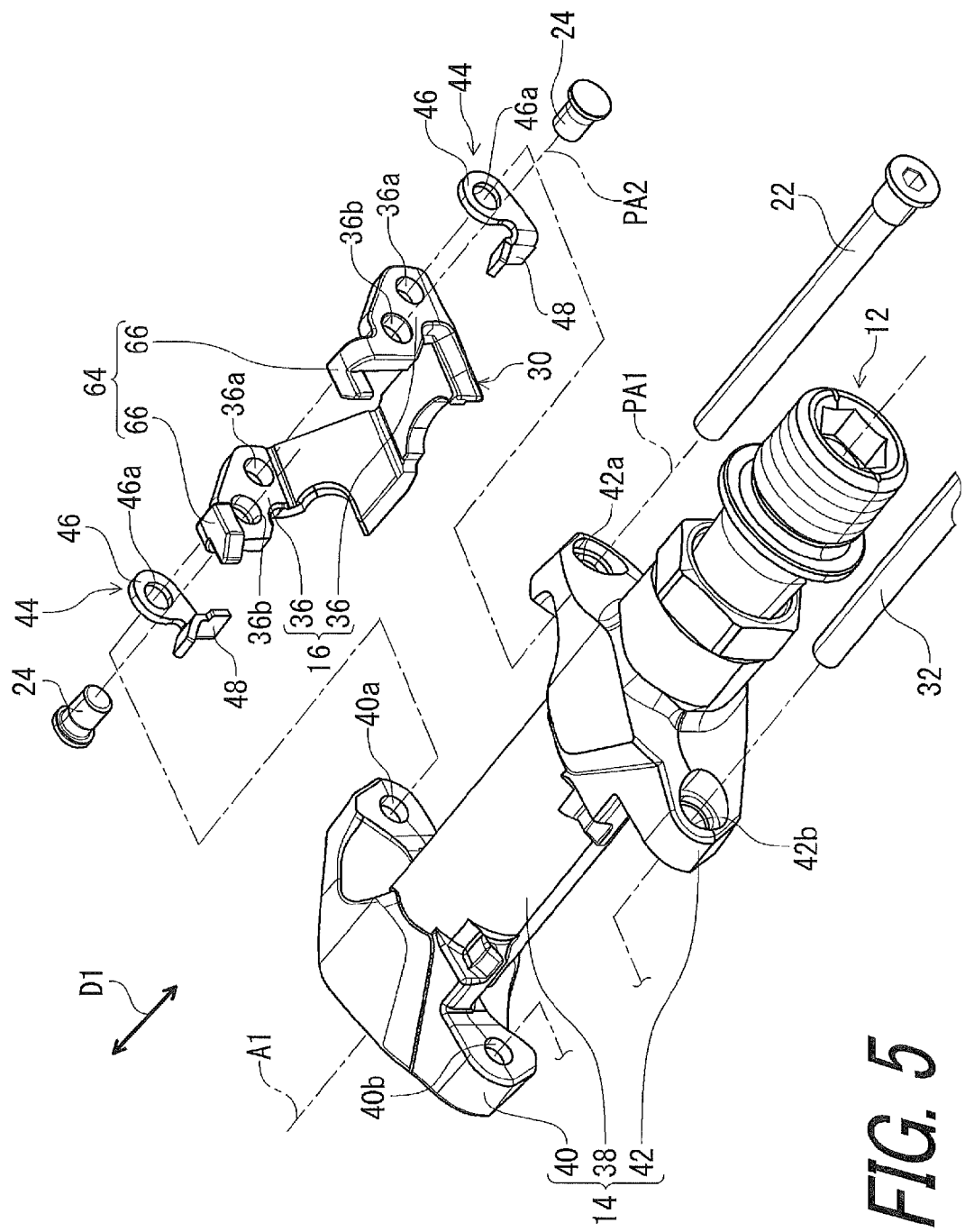
FIG. 5 is a partial exploded perspective view of the bicycle pedal illustrated in FIG. 1.

As seen in FIG. 5, the first sub member 16 includes a pair of coupling portions 36 spaced apart from each other in an axial direction D1 parallel to the rotational axis A1 of the pedal body 14 (FIG. 3). The coupling portions 36 are coupled to each other by the fourth clamping member 30. Each of the coupling portions 36 includes a first pivot hole 36a and a second pivot hole 36b. The first pivot shaft 22 extends through the first pivot holes 36a. The second pivot shafts 24 respectively extend through the second pivot holes 36b.

As seen in FIG. 5, the pedal body 14 includes an axle portion 38, a first support 40, and a second support 42. The axle portion 38 has a cylindrical shape and extends in the axial direction D1. The axle portion 38 is rotatably supported on the pedal axle 12. The first support 40 is secured to the axle portion 38. The second support 42 is secured to the axle portion 38 and is spaced apart from the first support 40 in the axial direction D1. In the illustrated embodiment, the first support 40 and the second support 42 are integrally provided with the axle portion 38 as a single unitary member. However, at least one of the first support 40 and the second support 42 can be a separate member from the axle portion 38 if needed and/or desired.

As seen in FIG. 5, the first support 40 includes first securing holes 40a and 40b. The second support 42 includes second securing holes 42a and 42b. Each of the first securing holes 40a and 40b includes an internal thread, for example. The first pivot shaft 22 includes a threaded part screwed in the first securing hole 40a. The first pivot shaft 22 extends through the second securing hole 42a. The third pivot shaft 32 includes a threaded part screwed in the first securing hole 40b. The third pivot shaft 32 extends through the second securing hole 42b.

The bicycle pedal 10 further comprises a pair of stoppers 44. The stoppers 44 are fixedly coupled to the pedal body 14 by the first pivot shaft 22. In the illustrated embodiment, the stoppers 44 have a symmetrical shape in the axial direction D1. Each of the stoppers 44 includes a base part 46 and a contact part 48. The base part 46 includes a through-hole 46a. The first pivot shaft 22 extends through the through-holes 46a. The contact part 48 protrudes from the base part 46 in the axial direction D1.

Figure 6:
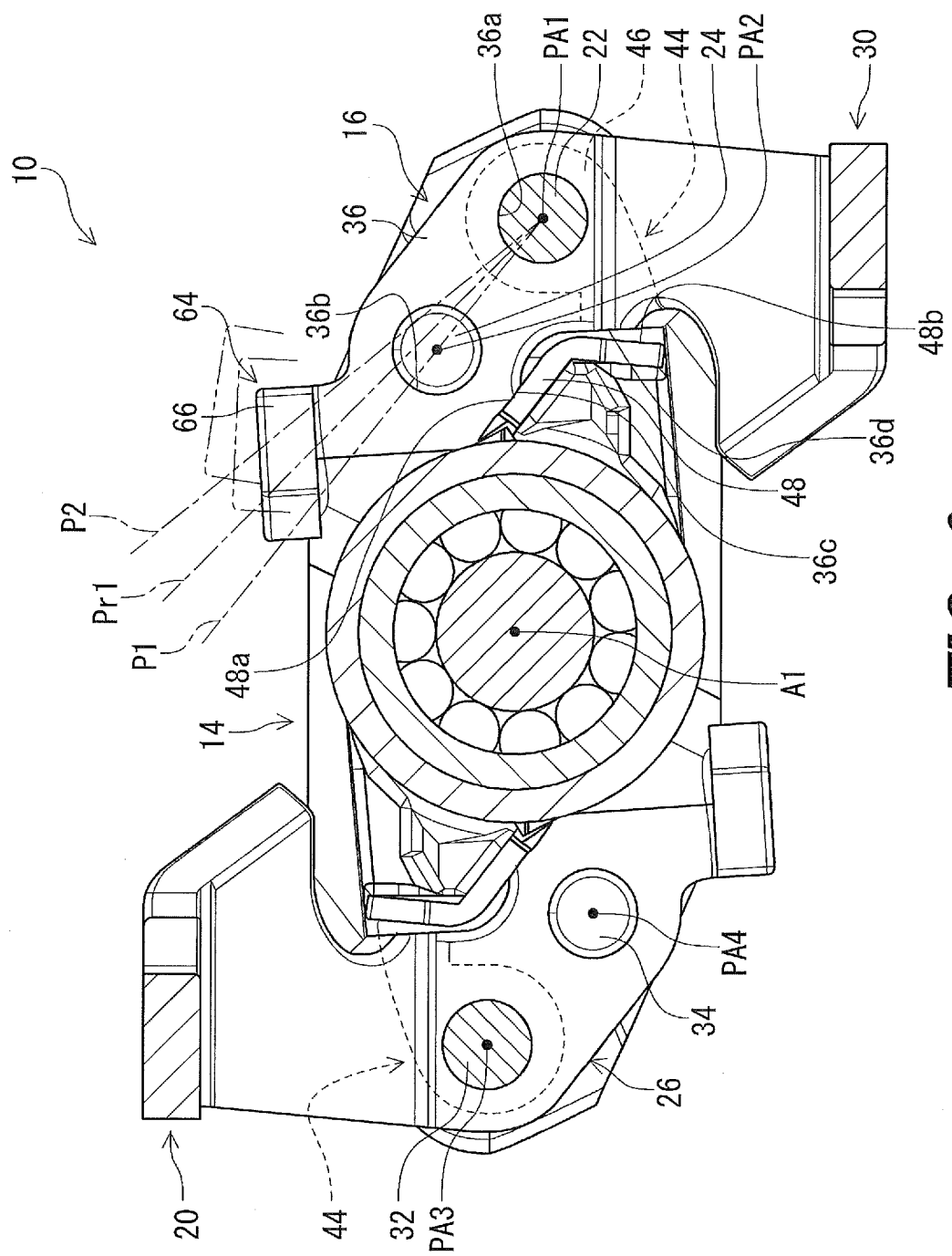
FIG. 6 is a cross-sectional view of the bicycle pedal taken along line VI-VI of FIG. 1.

As seen in FIG. 6, the contact part 48 is provided between the coupling portion 36 and the pedal body 14. The contact part 48 is contactable with the coupling portion 36 of the first sub member 16. The contact part 48 is provided between the pedal body 14 and the coupling portion 36 of the first sub member 16. The contact part 48 includes a first receiving surface 48a and a second receiving surface 48b. The first receiving surface 48a is inclined relative to the second receiving surface 48b. The coupling portion 36 includes a first contact surface 36c and a second contact surface 36d. The first contact surface 36c is contactable with the first receiving surface 48a. The second contact surface 36d is contactable with the second receiving surface 48b. The first contact surface 36c is inclined relative to the second contact surface 36d.

The first sub member 16 is positioned at the first position P1 in a state where the first contact surface 36c contacts the first receiving surface 48a. The first sub member 16 is positioned at the second position P2 in a state where the second contact surface 36d contacts the second receiving surface 48b.

Figure 7:
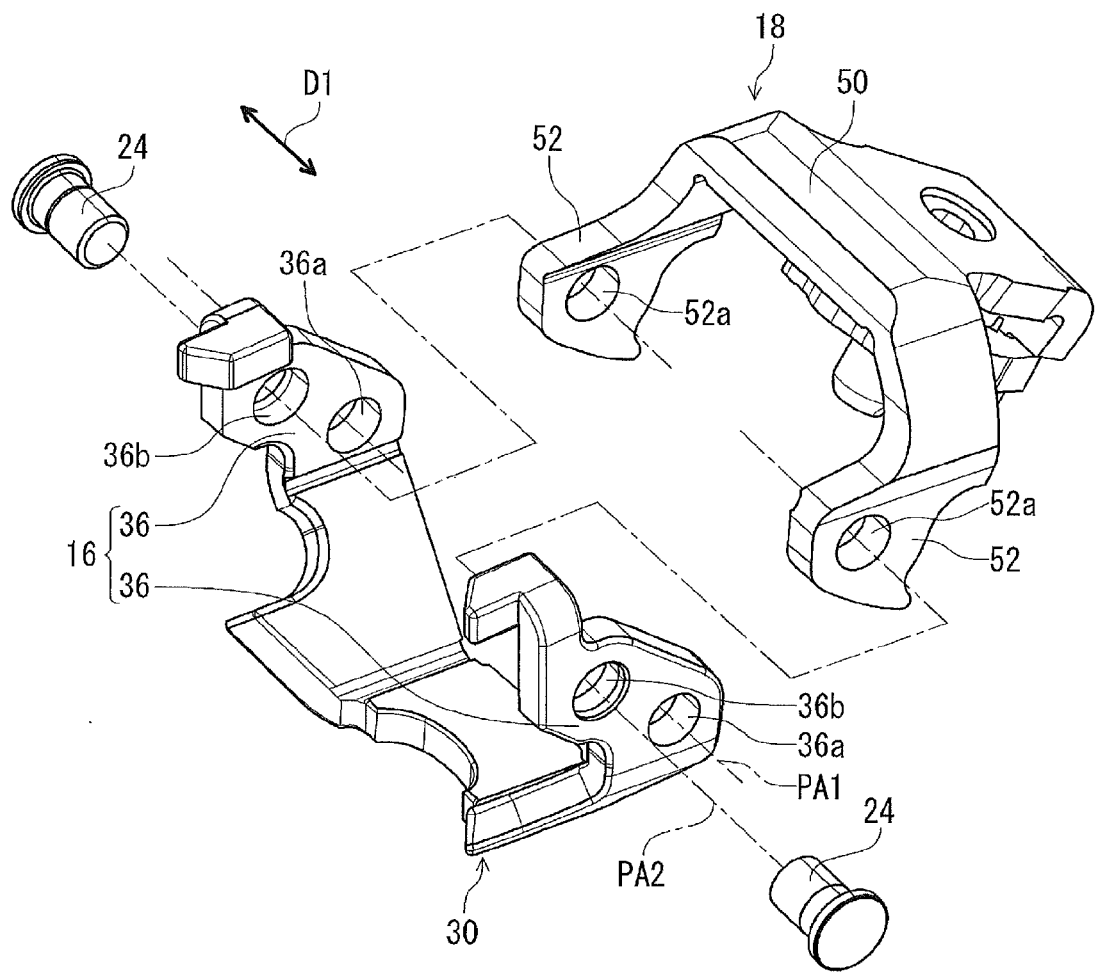
FIG. 7 is a partial exploded perspective view of the bicycle pedal illustrated in FIG. 1.

As seen in FIG. 7, the first clamping member 18 includes a clamping body 50 and a pair of attachment portions 52. The clamping body 50 is configured to engage with the rear end 2a of the cleat 2 (FIG. 1). The attachment portions 52 are coupled to each other by the clamping body 50. The attachment portions 52 protrude from the clamping body 50 and are spaced apart from each other in the axial direction D1. Each of the attachment portions 52 includes a pivot hole 52a. The second pivot shaft 24 extends through the pivot hole 52a to pivotably support the first clamping member 18 relative to the first sub member 16 about the second pivot axis PA2.

Figure 8:
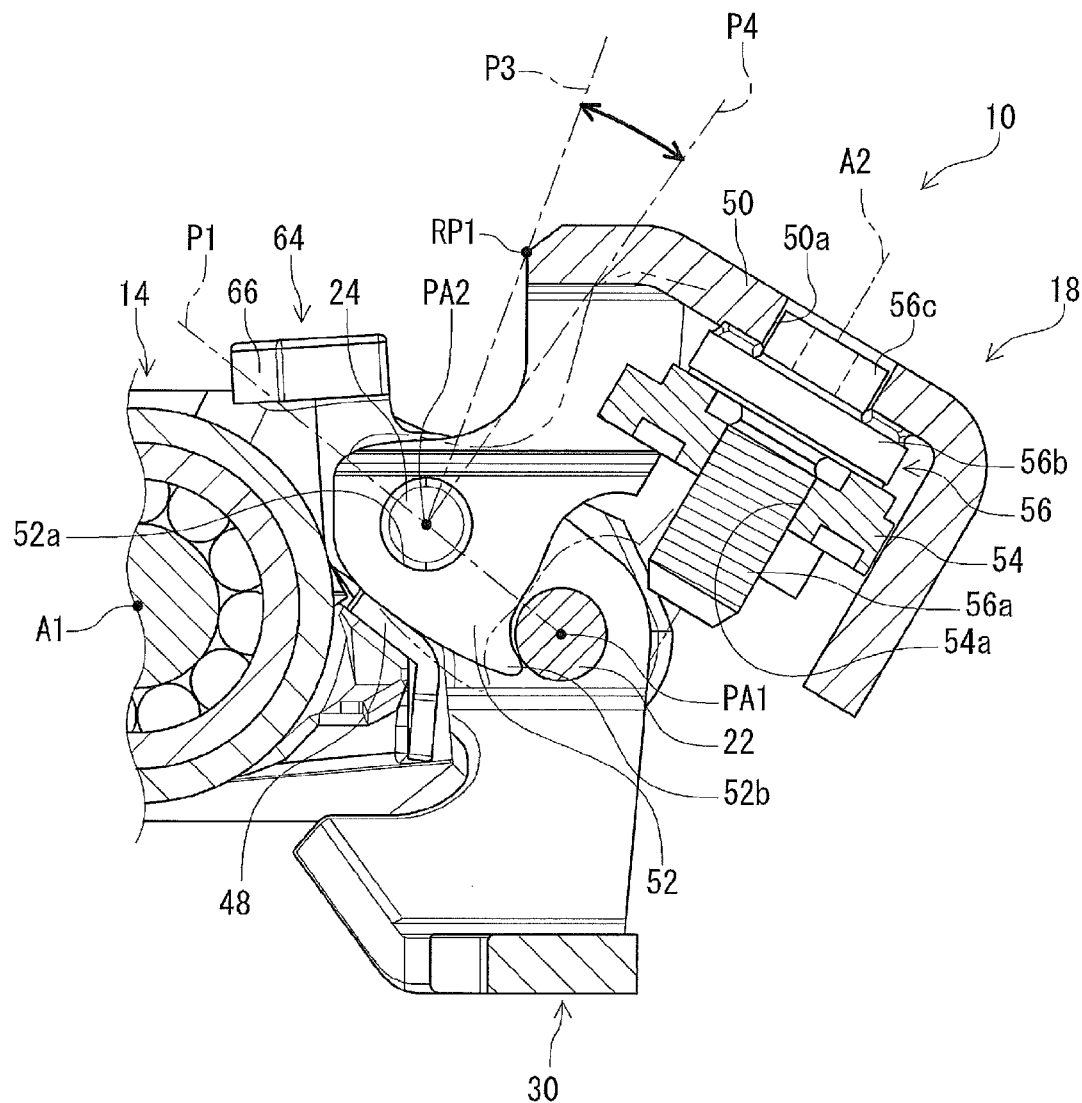
FIG. 8 is a partial enlarged cross-sectional view of the bicycle pedal taken along line VIII-VIII, with a biasing structure removed for the purpose of illustration.

As seen in FIG. 8, the attachment portion 52 includes a positioning part 52b configured to restrict the first clamping member 18 from pivoting relative to the first sub member 16 about the second pivot axis PA2. The positioning part 52b is contactable with the first pivot shaft 22. The first clamping member 18 is positioned at the third position P3 relative to the first sub member 16 in a state where the positioning part 52b of the attachment portion 52 contacts the first pivot shaft 22. The positioning part 52b allows the first clamping member 18 to pivot relative to the first sub member 16 about the second pivot axis PA2 from the third position P3 toward the fourth position P4.

As seen in FIG. 8, the first clamping member 18 further includes an adjustment plate 54 and an adjustment bolt 56. The adjustment plate 54 has a threaded hole 54a. The adjustment bolt 56 includes a thread bolt 56a, a flange portion 56b, and a head portion 56c. The adjustment bolt 56 protrudes from the flange portion 56b. The head portion 56c protrudes from the flange portion 56b toward an opposite side of the thread bolt 56a. The thread bolt 56a is screwed in the threaded hole 54a. The flange portion 56b is provided between the adjustment plate 54 and the clamping body 50. The flange portion 56b engages with the clamping body 50. The clamping body 50 includes a through-hole 50a. The head portion 56c is provided in the through-hole 50a. The adjustment bolt 56 is rotatable relative to the clamping body 50 and the adjustment plate 54 about a center axis A2 of the adjustment bolt 56.

Figure 9:
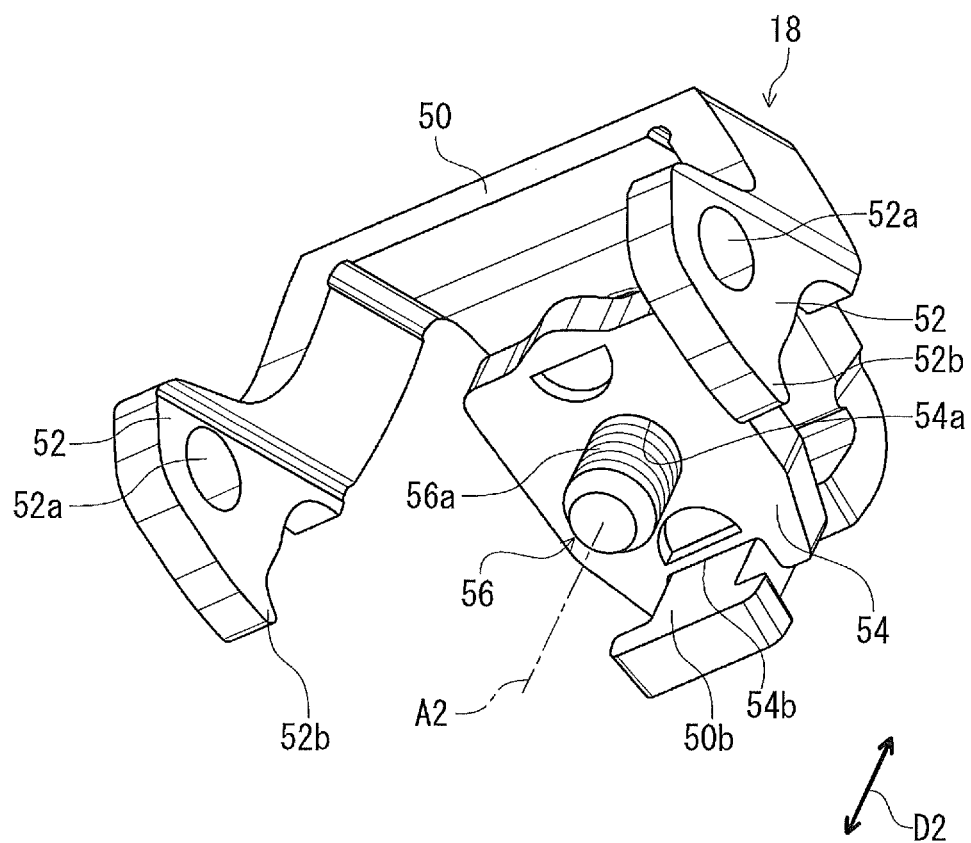
FIG. 9 is a perspective view of a first clamping member of the bicycle pedal illustrated in FIG. 1.

As seen in FIG. 9, the clamping body 50 includes a guide portion 50b configured to guide the adjustment plate 54 in an adjustment direction D2 parallel to the center axis A2 of the adjustment bolt 56. The adjustment plate 54 includes a guide groove 54b. The guide portion 50b is provided in the guide groove 54b to guide the adjustment plate 54 in the adjustment direction D2. The guide portion 50b is configured to prevent the adjustment plate 54 from rotating relative to the clamping body 50 about the center axis A2. Rotation of the adjustment bolt 56 relative to the clamping body 50 moves the adjustment plate 54 relative to the clamping body 50 in the adjustment direction D2.

Figure 10:
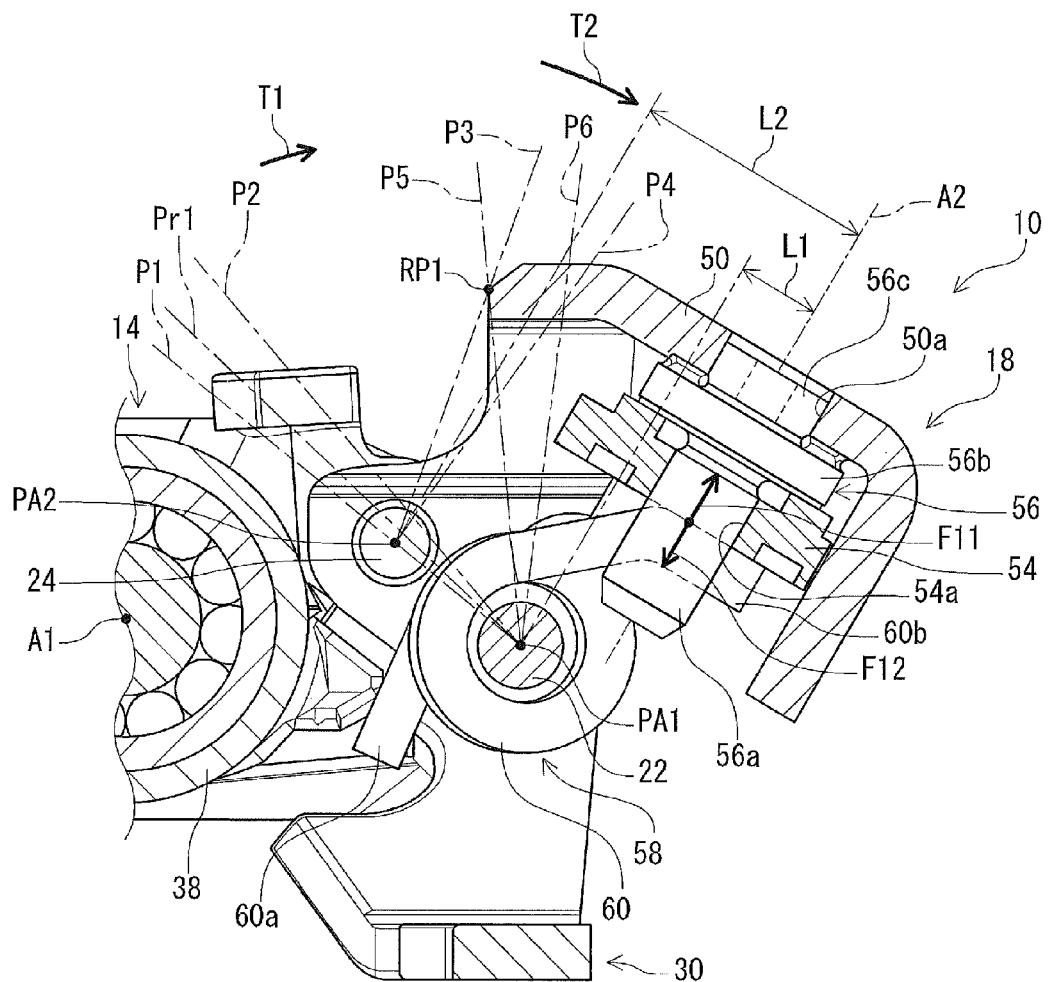
FIG. 10 is a partial enlarged cross-sectional view of the bicycle pedal taken along line X-X of FIG. 1.

As seen in FIG. 10, the bicycle pedal 10 comprises a biasing structure 58. The biasing structure 58 is configured to bias the first clamping member 18 toward the third position P3. The biasing structure 58 is configured to bias the first sub member 16 toward the first position P1. In the illustrated embodiment, the biasing structure 58 is configured to bias the first clamping member 18 (the adjustment plate 54) toward the third position P3 so that the first sub member 16 is biased toward the first position P1.

As seen in FIG. 4, the biasing structure 58 includes a first biasing member 60 and a second biasing member 62. The first biasing member 60 and the second biasing member 62 are arranged in the axial direction D1. In the illustrated embodiment, for example, each of the first biasing member 60 and the second biasing member 62 is a torsion spring. However, at least one of the first biasing member 60 and the second biasing member 62 can be a biasing member other than the torsion spring. The first biasing member 60 and the second biasing member 62 can be integrally provided with each other as a single unitary member. The biasing structure 58 can include only one biasing member to bias the first sub member 16 toward the first position P1.

The first pivot shaft 22 extends through the first biasing member 60 and the second biasing member 62. The first biasing member 60 and the second biasing member 62 are mounted to the pedal body 14 with the first pivot shaft 22. Thus, the first biasing member 60 and the second biasing member 62 are mounted on the first pivot axis PA1. However, the first biasing member 60 and the second biasing member 62 can be mounted on the second pivot axis PA2 or at the other location on the pedal body 14. The first biasing member 60 includes the first end 60a and the second end 60b. The second biasing member 62 includes a third end 62a and a fourth end 62b.

As seen in FIG. 10, the first biasing member 60 is configured to bias the first clamping member 18 relative to the pedal body 14 toward the third position P3. The first end 60a is configured to engage with the pedal body 14. The second end 60b is configured to engage with the first clamping member 18. In the illustrated embodiment, the first end 60a is configured to engage with the axle portion 38 of the pedal body 14. The second end 60b is configured to engage with the adjustment plate 54 of the first clamping member 18.

Figure 11:
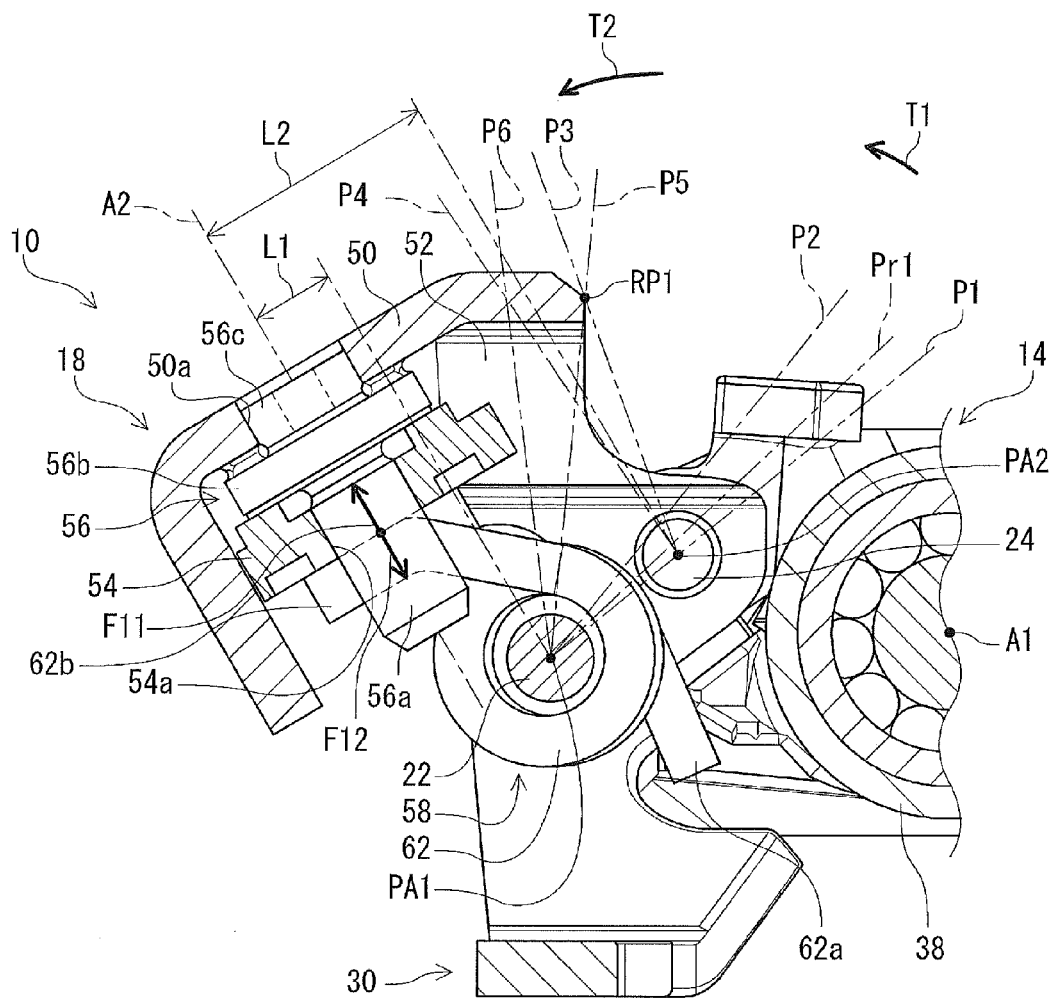
FIG. 11 is a partial enlarged cross-sectional view of the bicycle pedal taken along line XI-XI of FIG. 1.

As seen in FIG. 11, the second biasing member 62 is configured to bias the first clamping member 18 relative to the pedal body 14 toward the third position P3. The third end 62a is configured to engage with the pedal body 14. The fourth end 62b is configured to engage with the first clamping member 18. In the illustrated embodiment, the third end 62a is configured to engage with the axle portion 38 of the pedal body 14. The fourth end 62b is configured to engage with the adjustment plate 54 of the first clamping member 18.

As seen in FIGS. 10 and 11, the flange portion 56b of the adjustment bolt 56 is pressed against the clamping body 50 by the biasing structure 58 (the first biasing member 60 and the second biasing member 62). A biasing force F11 is applied to the first clamping member 18 (the adjustment plate 54) by the biasing structure 58 (the first biasing member 60 and the second biasing member 62). An actuating force F12 greater than an amount of the biasing force F11 is needed to pivot the first clamping member 18 toward the fourth position P4. The actuating force F12 directs in an opposite direction of the biasing force F11. Each of the biasing force F11 and the actuating force F12 can be defined on the center axis A2 of the adjustment bolt 56, for example.

As seen in FIG. 10, the first pivot axis PA1 is closer to the center axis A2 of the adjustment bolt 56 than the second pivot axis PA2. A first minimum distance L1 is defined between the first pivot axis PA1 and the center axis A2. A second minimum distance L2 is defined between the second pivot axis PA2 and the center axis A2. The first minimum distance L1 is shorter than the second minimum distance L2. Furthermore, the first pivot axis PA1 is farther from the pedal axle 12 than the second pivot axis PA2. More specifically, the first pivot axis PA1 is farther from the rotational axis A1 of the pedal body 14 than the second pivot axis PA2.

As seen in FIG. 10, the first sub member 16, the first pivot axis PA1, the first clamping member 18, the second pivot axis PA2 and the biasing structure 58 are configured such that a first torque T1 to pivot the first sub member 16 about the first pivot axis PA1 toward the second position P2 is less than a second torque T2 to pivot the first clamping member 18 about the second pivot axis PA2 toward the fourth position P4. In the illustrated embodiment, the first torque T1 can also be defined as a torque to pivot the first clamping member 18 about the first pivot axis PA1 toward the sixth position P6.

The first torque T1 is defined as a torque (a rotational moment) obtained by multiplying the actuating force F12 by the first minimum distance L1. The second torque T2 is defined as a torque (a rotational moment) obtained by multiplying the actuating force F12 by the second minimum distance L2. The first torque T1 is less than the second torque T2 since the first minimum distance L1 is shorter than the second minimum distance L2.

In the illustrated embodiment, the first torque T1 is less than the second torque T2. Accordingly, when the first clamping member 18 is pressed toward the fourth position P4 or the sixth position P6, the first clamping member 18 pivots relative to the pedal body 14 about the first pivot axis PA1 together with the first sub member 16 without pivoting relative to the first sub member 16 about the second pivot axis PA2.

In the bicycle pedal 10, however, the first sub member 16 is restricted from pivoting about the first pivot axis PA1 relative to the pedal body 14 when the cleat 2 (FIG. 1) is released from the bicycle pedal 10.

More specifically, as seen in FIG. 6, the bicycle pedal 10 comprises a restricting structure 64. The restricting structure 64 is configured to restrict the first sub member 16 from pivoting about the first pivot axis PA1 relative to the pedal body 14 toward the second position P2. In the illustrated embodiment, the restricting structure 64 is configured to restrict the first sub member 16 from moving from the restricted position Pr1 toward the second position P2. More specifically, the restricting structure 64 is configured to restrict the first sub member 16 from pivoting about the first pivot axis PA1 relative to the pedal body 14 from the restricted position Pr1 toward the second position P2. The restricted position Pr1 is defined between the first position P1 and the second position P2. However, the restricted position Pr1 can completely coincide with the first position P1.

As seen in FIG. 6, the restricting structure 64 includes a first pressed portion 66 configured to be pressed by the cleat 2 (FIG. 1) so that the first sub member 16 is restricted from pivoting relative to the pedal body 14 about the first pivot axis PA1 toward the second position P2. The first pressed portion 66 is pressed by the cleat 2 in a state where the first clamping member 18 and the second clamping member 20 clamp the cleat 2. The first sub member 16 is positioned at the restricted position Pr1 in a state where the first pressed portion 66 is pressed by the cleat 2. In other words, the first sub member 16 at the restricted position Pr1 is restricted from pivoting relative to the pedal body 14 about the first pivot axis PA1 toward the second position P2.

In the illustrated embodiment, as seen in FIG. 5, the restricting structure 64 includes a pair of first pressed portions 66 configured to be pressed by the cleat 2 so that the first sub member 16 is restricted from pivoting relative to the pedal body 14 about the first pivot axis PA1 toward the second position P2 (FIG. 6). Each of the first pressed portions 66 is contactable with the cleat 2. In the illustrated embodiment, each of the first pressed portions 66 is contactable with the attachment plate 8 of the cleat 2 (FIG. 1).

The first pressed portions 66 are spaced apart from each other in the axial direction D1. The first pressed portions 66 are respectively provided on the coupling portions 36. The first pressed portions 66 respectively protrude from the coupling portions 36.

As seen in FIG. 6, the first pressed portion 66 is provided on the first sub member 16 and is pivotable integrally with the first sub member 16 about the first pivot axis PA1. The first pressed portion 66 protrudes from the first sub member 16 away from the second pivot axis PA2. The second pivot axis PA2 is provided between the first pressed portion 66 and the first pivot axis PA1.

Figure 12:
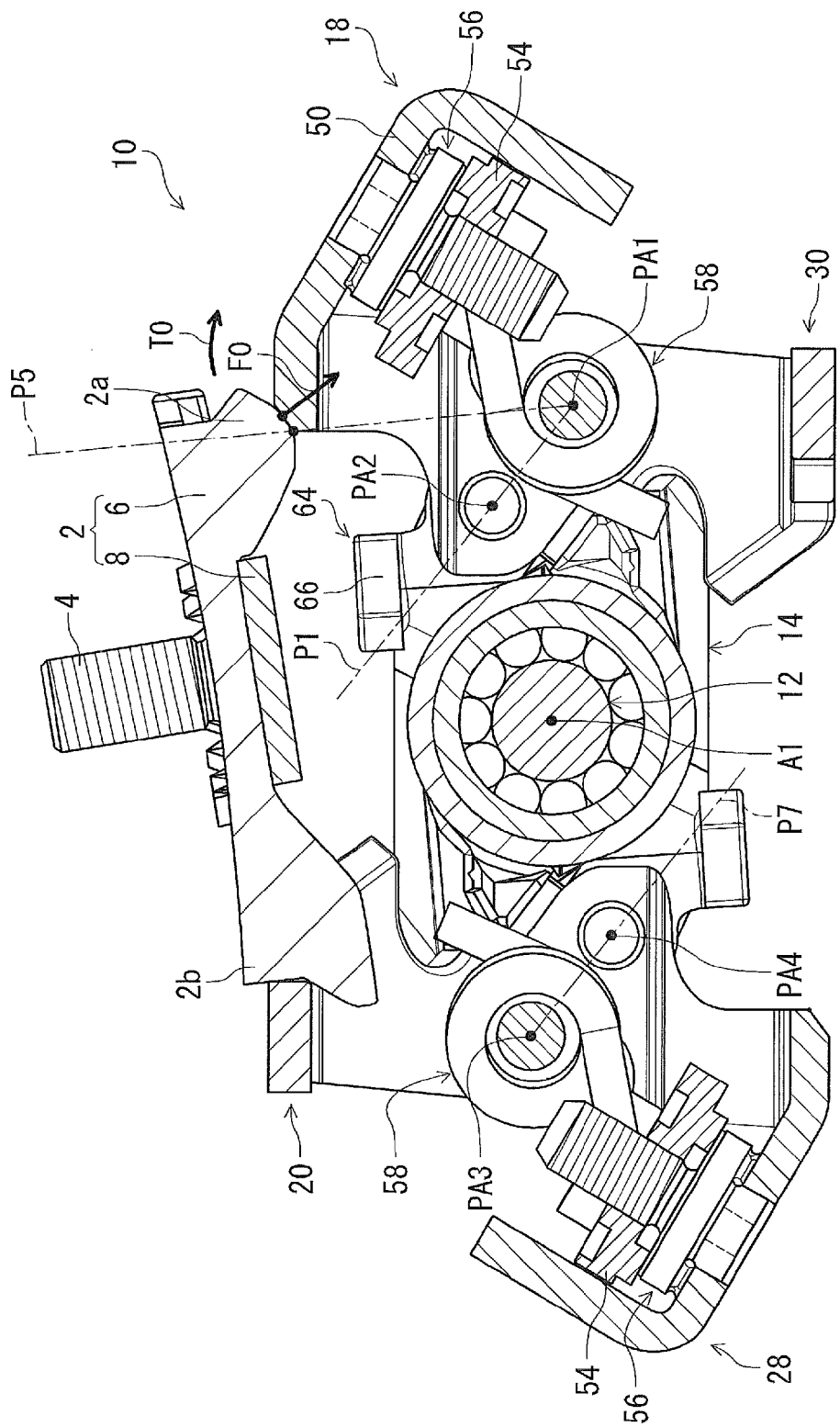
FIG. 12 is a cross-sectional view of the bicycle pedal illustrated in FIG. 1 for explaining a step-in operation of the bicycle pedal.

As seen in FIG. 12, the first pressed portion 66 is disposed at a position such that, in a step-in operation of the bicycle pedal 10, the first clamping member 18 comes into contact with the cleat 2 before the first pressed portion 66 comes into contact with the cleat 2. More specifically, in the step-in operation of the bicycle pedal 10, the front end 2a of the cleat 2 is engaged with the second clamping member 20. After that, the rear end 2b of the cleat 2 is pressed against the first clamping member 18. The step-in operation is an operation in which a user (a rider) clips into the bicycle pedal 10. An actuating force F0 is applied to the first clamping member 18 from the cleat 2 attached to the sole of the shoe (not shown). An actuating torque T0 is applied to the first clamping member 18 in response to the actuating force F0.

Figure 13:
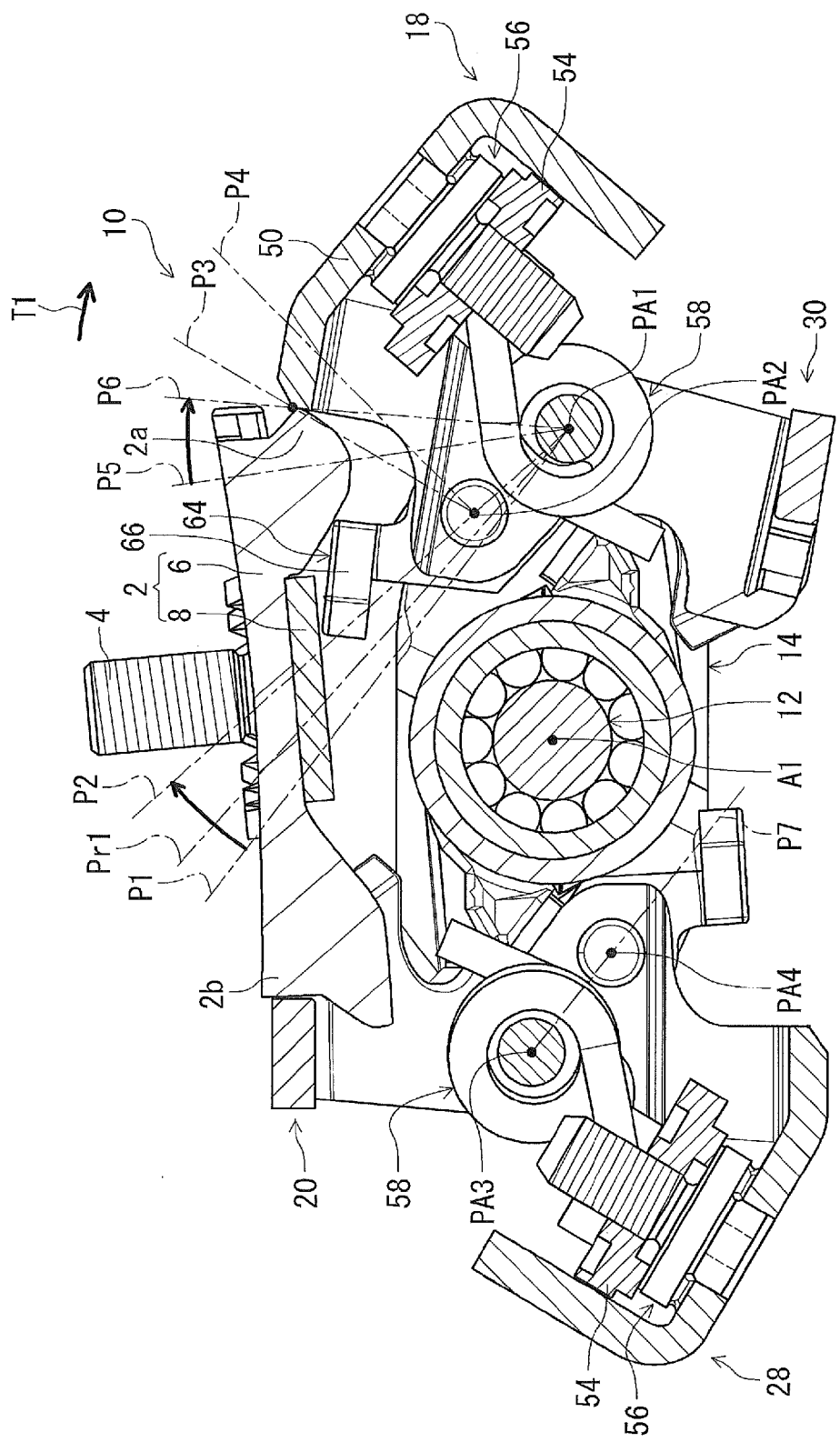
FIG. 13 is a cross-sectional view of the bicycle pedal illustrated in FIG. 1 for explaining the step-in operation of the bicycle pedal.

As seen in FIG. 13, when the actuating torque T0 reaches the first torque T1, the first clamping member 18 pivots relative to the pedal body 14 about the first pivot axis PA1 together with the first sub member 16. The first clamping member 18 pivots relative to the pedal body 14 about the first pivot axis PA1 from the fifth position P5 to the sixth position P6. At this time, the first clamping member 18 is not pivoted relative to the first sub member 16 about the second pivot axis PA2 since the first torque T1 is less than the second torque T2. Namely, the first clamping member 18 is configured to pivot relative to the pedal body 14 toward the sixth position P6 about only the first pivot axis PA1 during the step-in operation of the bicycle pedal 10. In the state shown in FIG. 13, the cleat 2 comes into contact with the first pressed portions 66.

However, the cleat 2 can contact the first pressed portions 66 just before or almost at the same time as the finishing of the step-in operation, in order to reduce a required torque to move the first clamping member 18. In such an embodiment, the pressed portions 66 does not contact the cleat 2 until the finishing the step-in operation. In other words, the first clamping member 18 can pivot relative to the pedal body 14 substantially only about the first pivot axis PA1 without pivoting about the second pivot axis PA2 during the step-in operation of the bicycle pedal 10.

Figure 14:
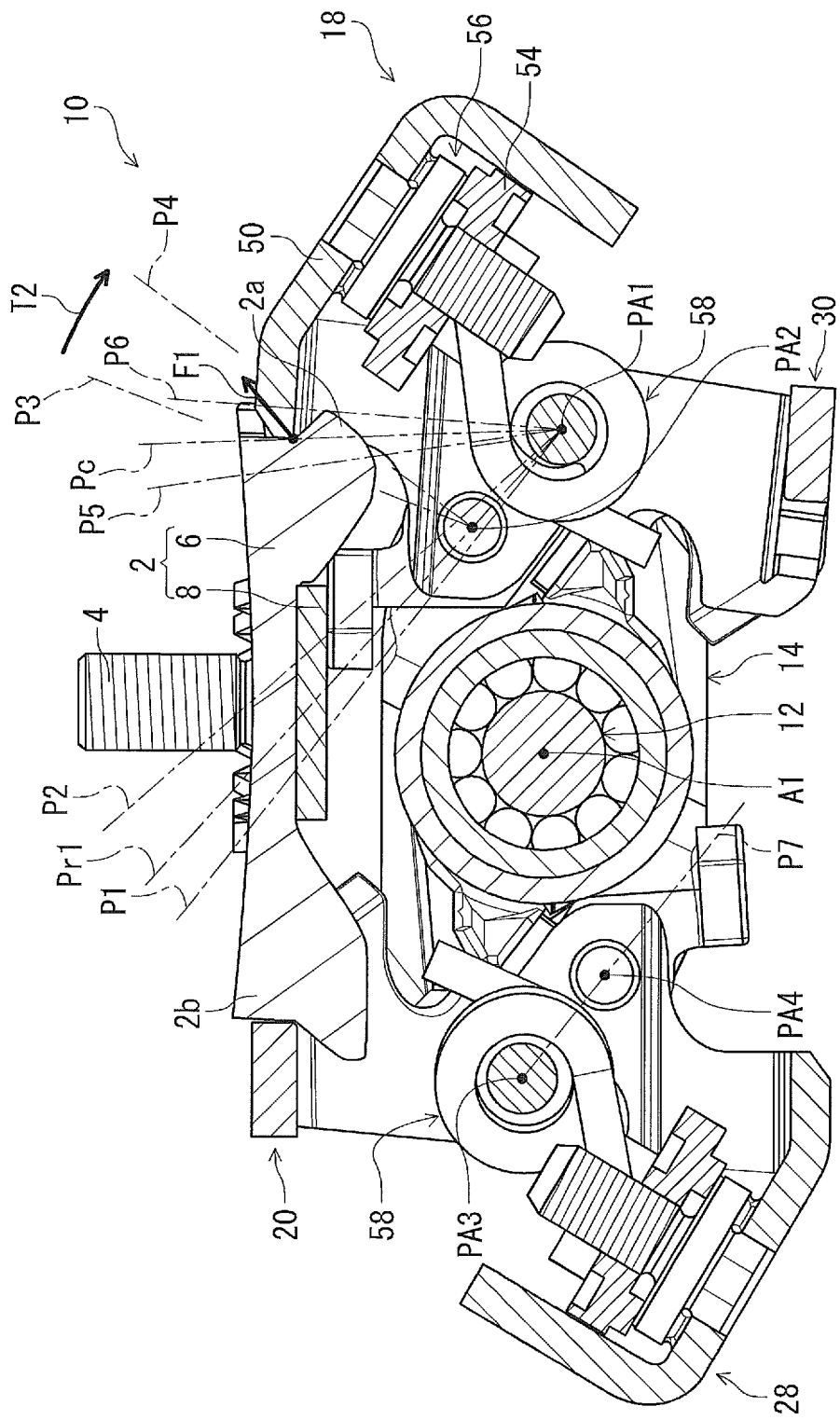
FIG. 14 is a cross-sectional view of the bicycle pedal illustrated in FIG. 1 for explaining the step-in operation of the bicycle pedal.

As seen in FIG. 14, when the cleat 2 is further pressed against the first clamping member 18, the rear end 2a of the cleat 2 enters under the first clamping member 18. Thus, the cleat 2 is clamped between the first clamping member 18 and the second clamping member 20. In this state, the first clamping member 18 is positioned at the clamping position Pc defined between the fifth position P5 and the sixth position P6.

The first pressed portions 66 of the restricting structure 64 contact the cleat 2 in a state where the cleat 2 is clamped between the first clamping member 18 and the second clamping member 20. The first sub member 16 is positioned at the first position P1 in a state where the first pressed portions 66 contact the cleat 2. In this state, the restricting structure 64 restricts the first sub member 16 from pivoting relative to the pedal body 14 about the first pivot axis PA1 toward the second position P2.

During a step-out operation (an operation in which the user releases the cleat 2 of the shoe from the bicycle pedal 10), for example, the user (e.g., a rider) twists the shoe about a vertical axis to apply a removing force F1 via the cleat 2 to the first clamping member 18. When the rider twist the shoe in a state where the first pressed portions 66 of the restricting structure 64 are pressed by the cleat 2, the cleat 2 slides with the first pressed portions 66 so that the restricting structure 64 restricts the first sub member 16 from pivoting relative to the pedal body 14 about the first pivot axis PA1 toward the second position P2. Accordingly, the first clamping member 18 is configured to pivot relative to the first sub member 16 toward the fourth position P4 about only the second pivot axis PA2 during the step-out operation of the bicycle pedal 10.

With the bicycle pedal 10, the second torque T2 is needed to pivot the first clamping member 18 about the second pivot axis PA2 toward the fourth position P4 in the step-out operation of the bicycle pedal 10. On the other hand, the first torque T1 is needed to pivot the first sub member 16 (the first clamping member 18) about the first pivot axis PA1 toward the second position P2 in the step-in operation. Since the first torque T1 is less than the second torque T2, it is possible to make the step-in operation easier for the user while the cleat 2 is strongly held by the bicycle pedal 10 so that the cleat 2 is prevented from being unintentionally released from the bicycle pedal 10.

Second Embodiment

A bicycle pedal 210 in accordance with a second embodiment will be described below referring to FIGS. 15 and 16. The bicycle pedal 210 has the same configuration as the bicycle pedal 10 except for the biasing structure 58. Thus, elements having substantially the same function as those in the first embodiment will be numbered the same here, and will not be described and/or illustrated again in detail here for the sake of brevity.

Figure 15:
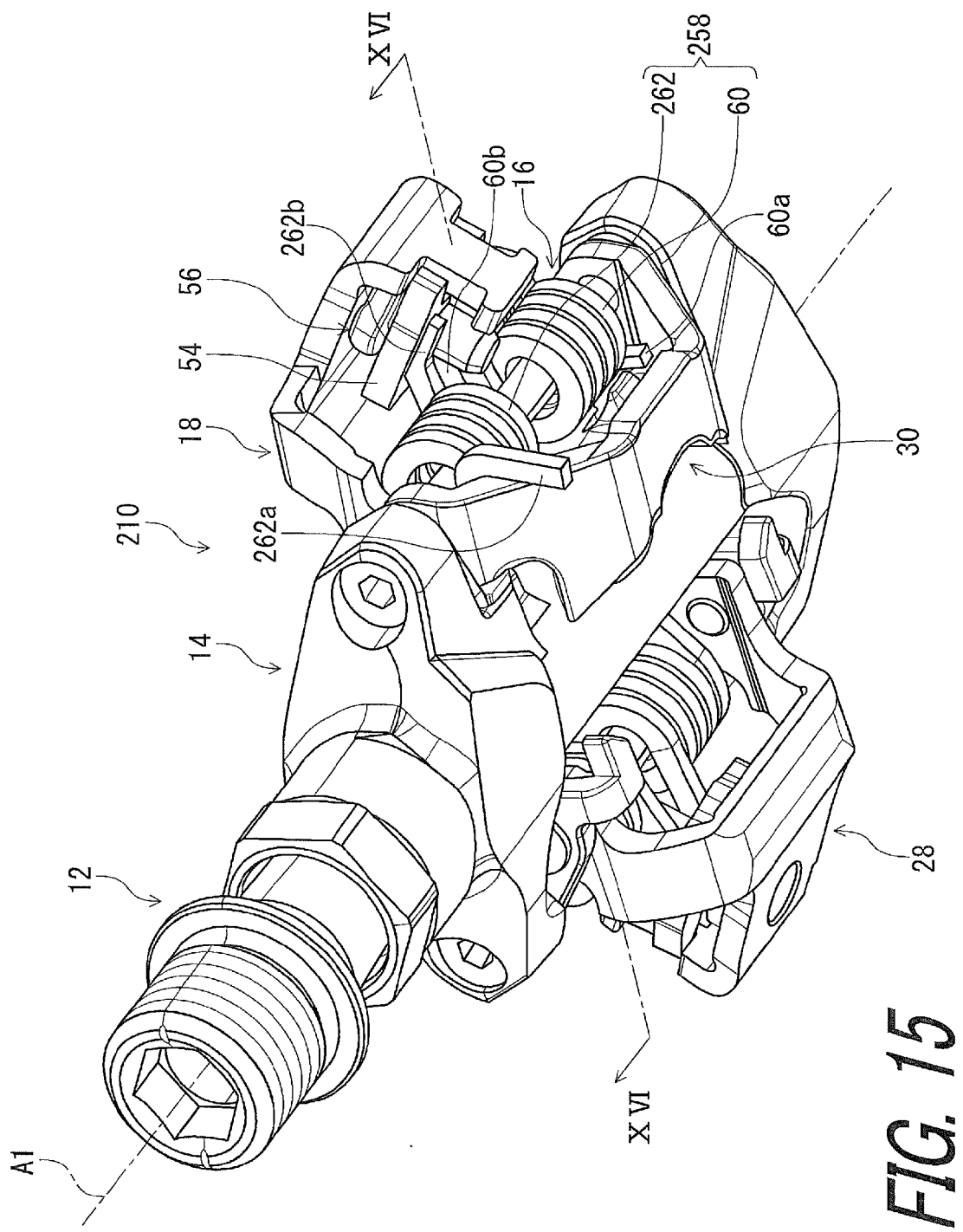
FIG. 15 is a perspective view of a bicycle pedal in accordance with a second embodiment.

As seen in FIG. 15, the bicycle pedal 210 comprises a biasing structure 258. The biasing structure 258 includes the first biasing member 60 and a second biasing member 262. The second biasing member 262 has substantially the same structure as the structure of the second biasing member 62 in accordance with the first embodiment. However, the second biasing member 262 is configured to bias the first clamping member 18 relative to the first sub member 16.

Figure 16:
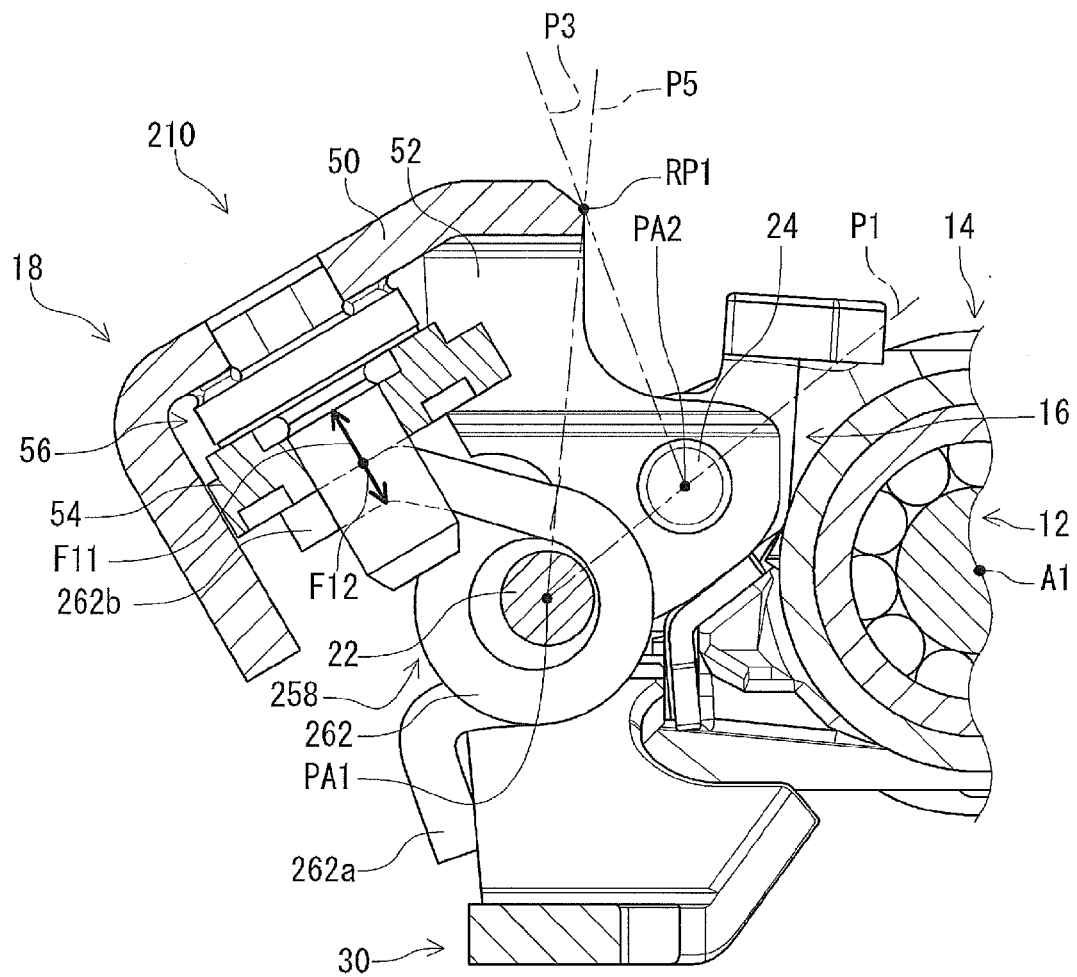
FIG. 16 is a partial enlarged cross-sectional view of the bicycle pedal taken along line XVI-XVI of FIG. 15.

As seen in FIG. 16, the second biasing member 262 is configured to bias the first clamping member 18 relative to the first sub member 16 toward the third position P3. As seen in FIGS. 15 and 16, the second biasing member 262 includes a third end 262a and a fourth end 262b. The third end 262a is configured to engage with the first sub member 16. The fourth end 262b is configured to engage with the first clamping member 18. The third end 262a can engage with the fourth clamping member 30, which is integrally provided with the sub member 16, instead of the first sub member 16.

During the step-in operation, when the first clamping member 18 pivots relative to the pedal body 14 about the first pivot axis PA1, the first sub member 16 pivots relative to the pedal body 14 about the first pivot axis PA1 together with the first clamping member 18. At this time, the first biasing member 60 is further compressed between the first clamping member 18 and the pedal body 14 from an initial compressed state. However, the second biasing member 262 is not further compressed between the first clamping member 18 and the first sub member 16 from an initial compressed state. During the step-out operation, when the first clamping member 18 pivots relative to the sub member 16 about the second pivot axis PA2, the first biasing member 60 and the second biasing member 262 are further compressed from the initial compressed state. Accordingly, unlike the bicycle pedal 10 in accordance with the first embodiment, only a biasing force of the first biasing member 60 is applied to the first clamping member 18 during the step-in operation of the bicycle pedal 210. This can reduce the first torque T1 in the step-in operation, allowing the step-in operation to be easier for the user than the bicycle pedal 10 in accordance with the first embodiment.

Third Embodiment

A bicycle pedal 310 in accordance with a third embodiment will be described below referring to FIGS. 17 to 26. The bicycle pedal 310 has the same configuration as the bicycle pedal 10 except for the restricting structure 64. Thus, elements having substantially the same function as those in the above embodiments will be numbered the same here, and will not be described and/or illustrated again in detail here for the sake of brevity.

Figure 17:
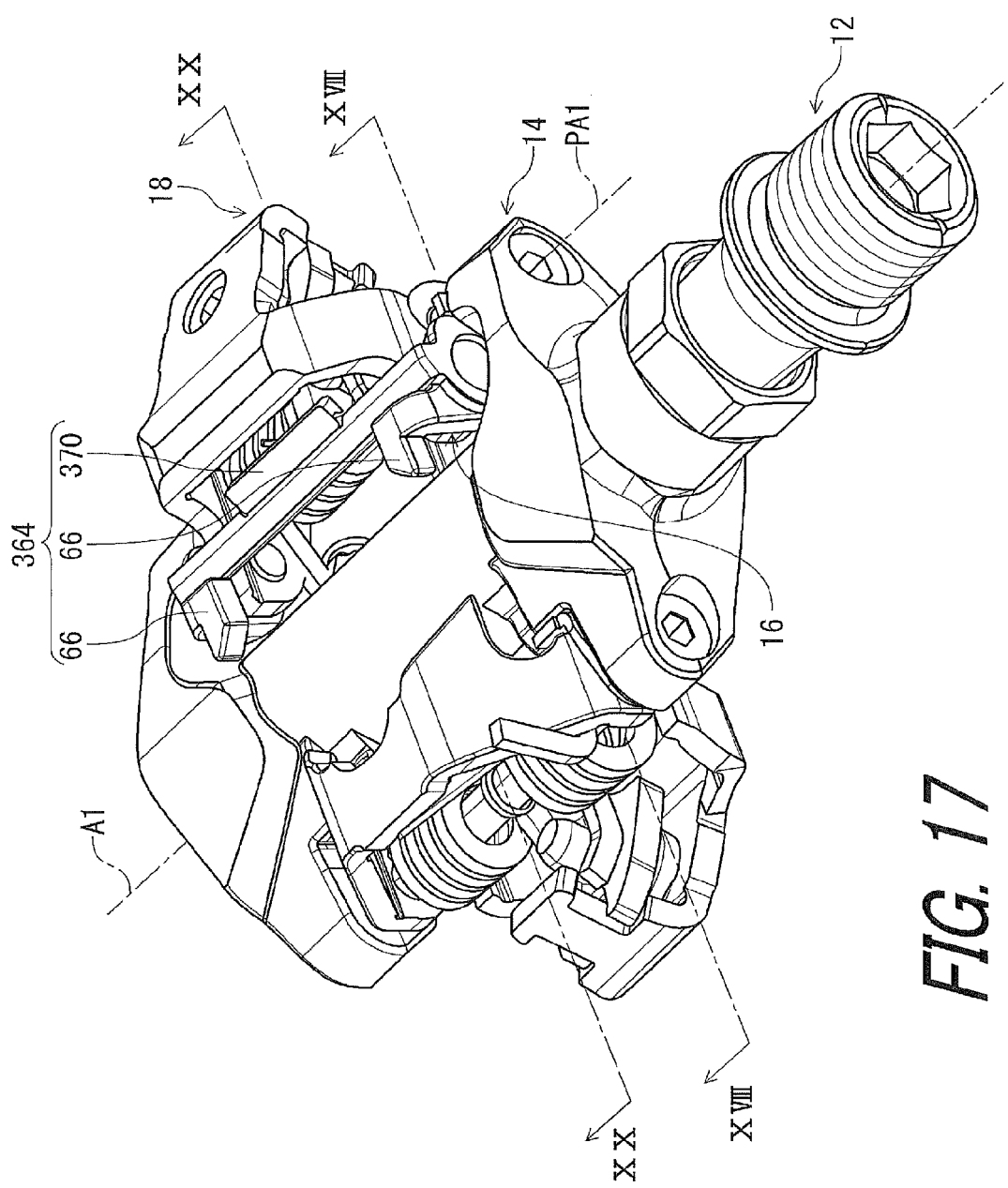
FIG. 17 is a perspective view of a bicycle pedal in accordance with a third embodiment.
Figure 18:
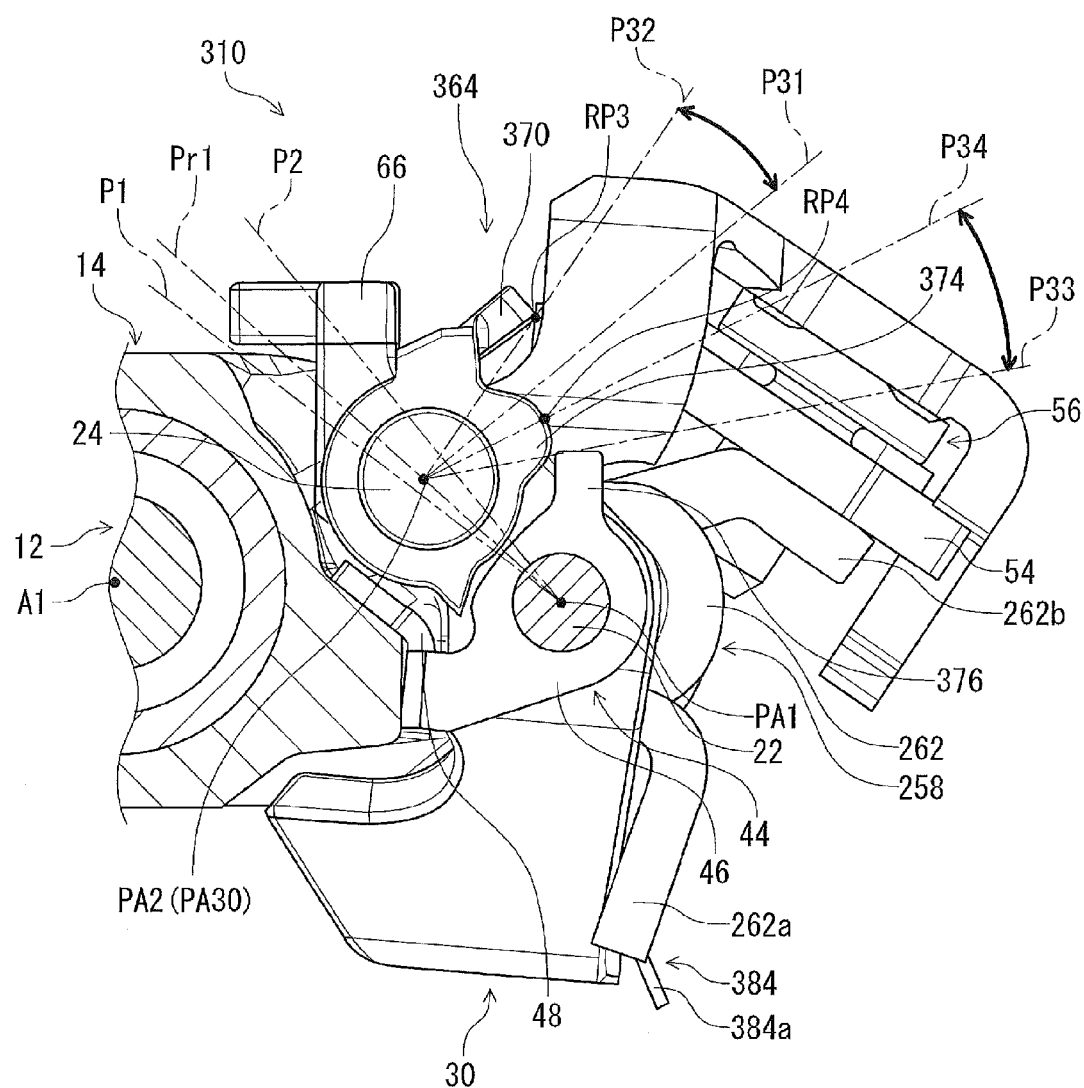
FIG. 18 is a partial enlarged cross-sectional view of the bicycle pedal taken along line XVIII-XVIII of FIG. 17.

As seen in FIGS. 17 and 18, the bicycle pedal 310 comprises a restricting structure 364 configured to restrict the first sub member 16 from pivoting about the first pivot axis PA1 relative to the pedal body 14 toward the second position P2. More specifically, the restricting structure 364 includes a second pressed portion 370 configured to be pressed by the cleat 2 so that the first sub member 16 is restricted from pivoting relative to the pedal body 14 about the first pivot axis PA1 toward the second position P2. The restricting structure 364 includes the first pressed portions 66 in accordance with the first embodiment. However, at least one of the first pressed portions 66 can be omitted from the bicycle pedal 310 if needed and/or desired.

As seen in FIG. 18, the second pressed portion 370 is movable relative to the first sub member 16 between a pressed position P31 at which the second pressed portion 370 is pressed by the cleat 2, and a rest position P32 at which the second pressed portion 370 is not pressed by the cleat 2. In the illustrated embodiment, the pressed position P31 and the rest position P32 are defined based on a reference point RP3. The second pressed portion 370 is pivotable relative to the first sub member 16 about an additional pivot axis PA30 between the pressed position P31 and the rest position P32. In the illustrated embodiment, the additional pivot axis PA30 coincides with the second pivot axis PA2. However, the additional pivot axis PA30 can be offset from the second pivot axis PA2 if needed and/or desired.

The restricting structure 364 restricts the first sub member 16 from pivoting relative to the pedal body 14 about the first pivot axis PA1 toward the second position P2 in a state where the second pressed portion 370 is disposed at the pressed position P31. The restricting structure 364 allows the first sub member 16 to pivot relative to the pedal body 14 about the first pivot axis PA1 toward the second position P2 in a state where the second pressed portion 370 is disposed at the rest position P32.

As seen in FIG. 18, the restricting structure 364 includes a first restricting part 374 and a second restricting part 376. The first restricting part 374 is pivotable integrally with the second pressed portion 370 relative to the first sub member 16 about the additional pivot axis PA30 between a restricting position P33 and a release position P34. In the illustrated embodiment, the restricting position P33 and the release position P34 are defined based on a reference point RP4. The restricting position P33 corresponds to the pressed position P31. The release position P34 corresponds to the rest position P32.

Figure 19:
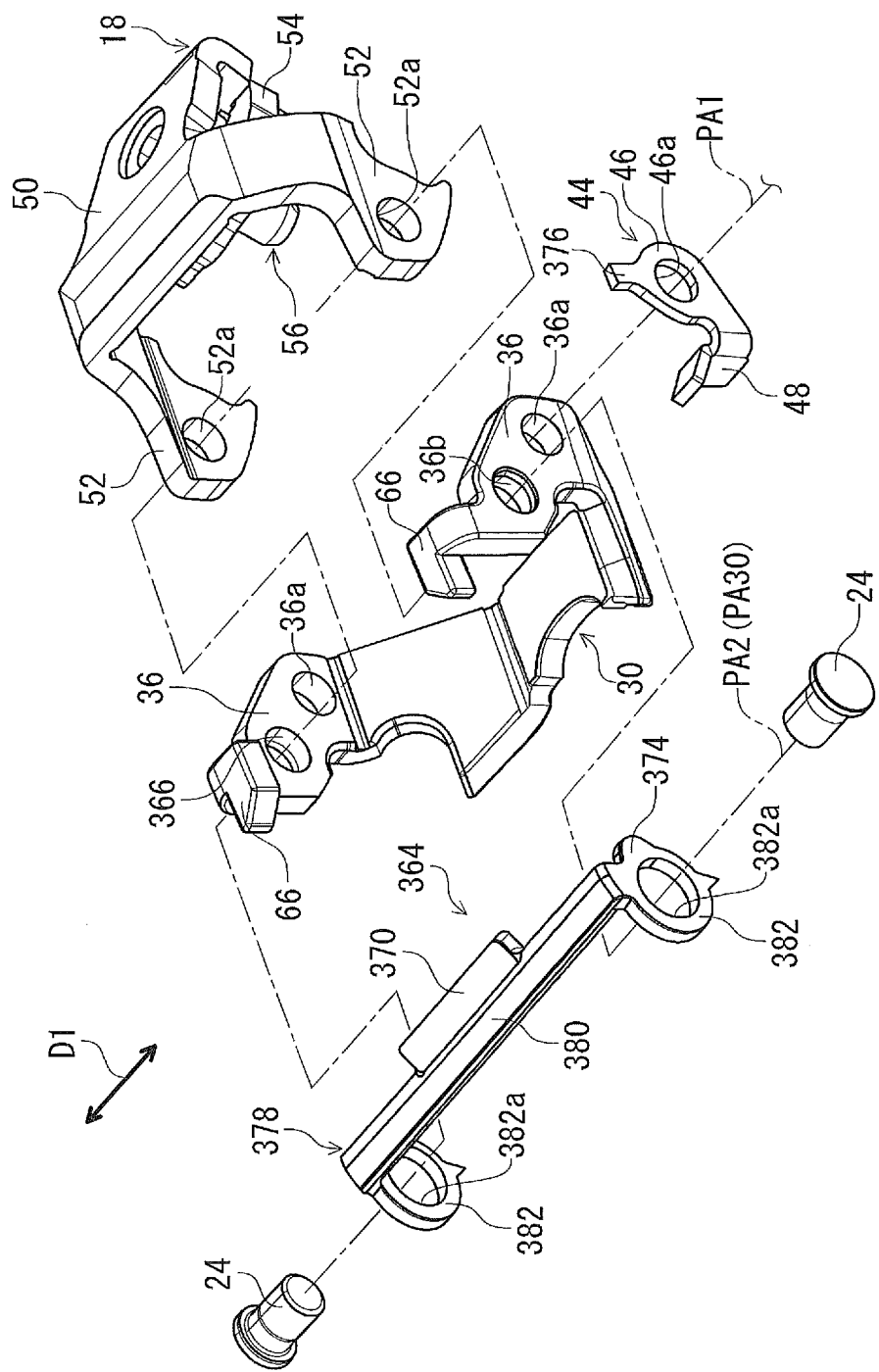
FIG. 19 is a partial exploded perspective view of the bicycle pedal illustrated in FIG. 17.

As seen in FIG. 19, the restricting structure 364 includes a restricting member 378. The restricting member 378 is pivotable relative to the pedal body 14, the first sub member 16, and the first clamping member 18 about the second pivot axis PA2 (the additional pivot axis PA30). The second pressed portion 370 is provided on the restricting member 378. The first restricting part 374 is provided on the restricting member 378. In the illustrated embodiment, the second pressed portion 370 and the first restricting part 374 are integrally provided with the restricting member 378 as a single unitary member. However, at least one of the second pressed portion 370 and the first restricting part 374 can be separate from the restricting member 378 if needed and/or desired.

The restricting member 378 includes an intermediate part 380 and a pair of coupling parts 382. The intermediate part 382 has a plate shape and extends in the axial direction D1. The second pressed portion 370 protrudes from the intermediate part 380. The coupling parts 382 are coupled to each other by the intermediate part 380. The coupling parts 382 are respectively provided at ends of the intermediate part 380. The coupling parts 382 protrude from the intermediate part 380. Each of the coupling parts 382 includes a coupling hole 382a. The second pivot shaft 24 extends through the coupling hole 382a of the coupling part 382. Since the restricting member 378 is coupled to the first sub member 16 by the second pivot shaft 24, the restricting member 378 is pivotable together with the first sub member 16 about the additional pivot axis PA30.

As seen in FIG. 19, the second restricting part 376 is integrally provided with the pedal body 14. In the illustrated embodiment, the second restricting part 376 is provided on the base part 46 of the stopper 44. The second restricting part 376 protrudes radially outward from the base part 46. In the illustrated embodiment, one of the stoppers 44 is omitted from the bicycle pedal 310. The contact part 48 contacts the pedal body 14 so that the stopper 44 is not pivotable relative to the pedal body 14. The second restricting part 376 is integrally provided with the pedal body 14 as a separate member from the pedal body 14. However, the stopper 44 and the second restricting part 376 can be integrally provided with the pedal body 14 as a single unitary member if needed and/or desired.

Figure 20:
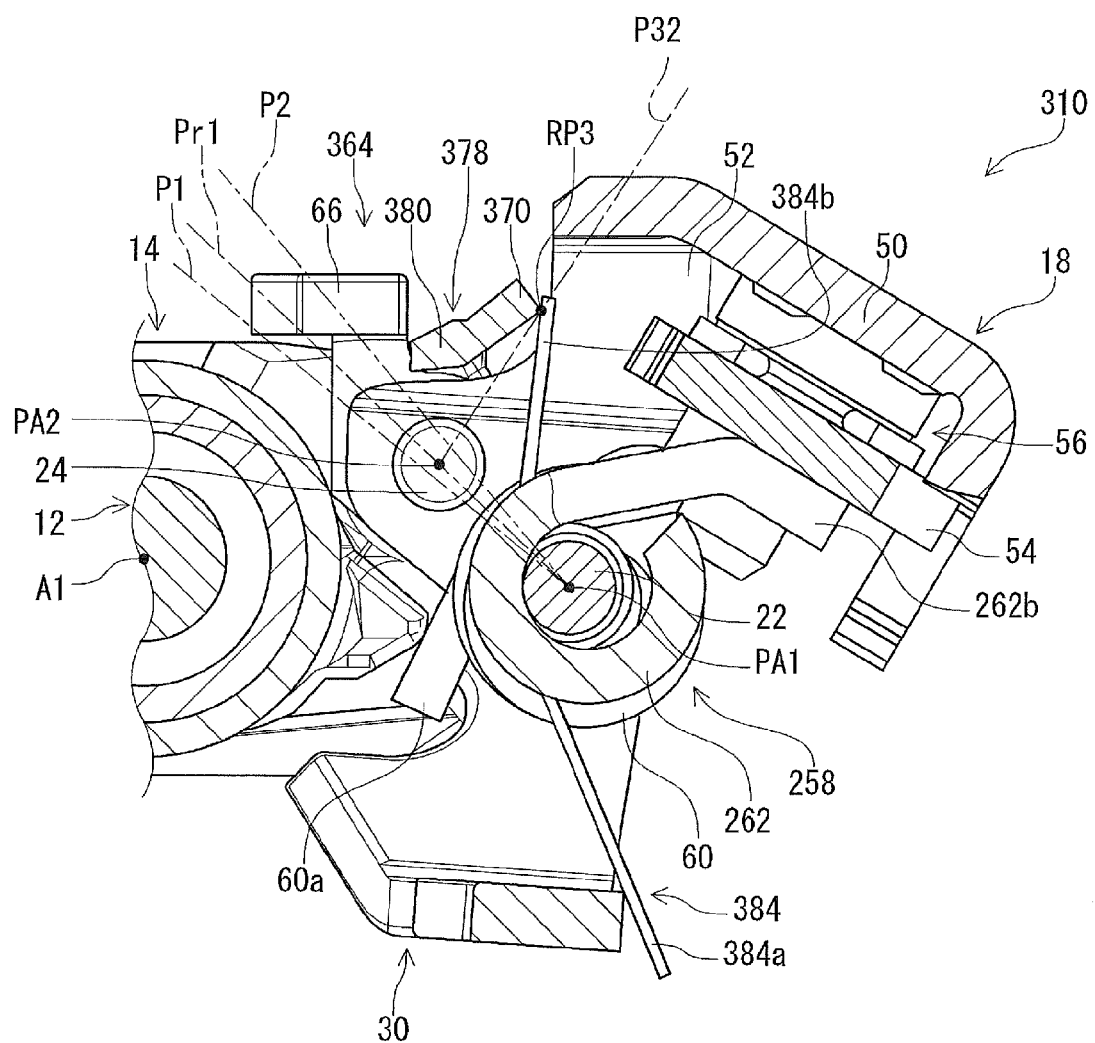
FIG. 20 is a partial enlarged cross-sectional view of the bicycle pedal taken along line XX-XX of FIG. 17.

As seen in FIG. 20, the biasing structure 58 includes a third biasing member 384 configured to bias the second pressed portion 370 to the rest position P32. In the illustrated embodiment, the third biasing member 384 is a torsion spring as well as the first biasing member 60 and the second biasing member 62. The third biasing member 384 has a spring constant lower than a spring constant of each of the first biasing member 60 and the second biasing member 62. The third biasing member 384 is mounted to the pedal body 14 by the first pivot shaft 22. The third biasing member 384 includes a fifth end 384a and a sixth end 384b. The fifth end 384a engages with the fourth clamping member 30. The sixth end 384b engages with the second pressed portion 370. The fifth end 384a can engage with other portions such as the pedal body 14 and the first sub member 16 if needed and/or desired. The sixth end 384a can engage with other portions such as the restricting member 378.

As seen in FIG. 18, the first restricting part 374 is spaced apart from the second restricting part 376 to allow the first sub member 16 to pivot relative to the pedal body 14 about the first pivot axis PA1 in a state where the first restricting part 374 is disposed at the release position P34. The first sub member 16 is pivotable relative to the pedal body 14 about the first pivot axis PA1 toward the second position P2 in the state where the first restricting part 374 is disposed at the release position P34.

Figure 21:
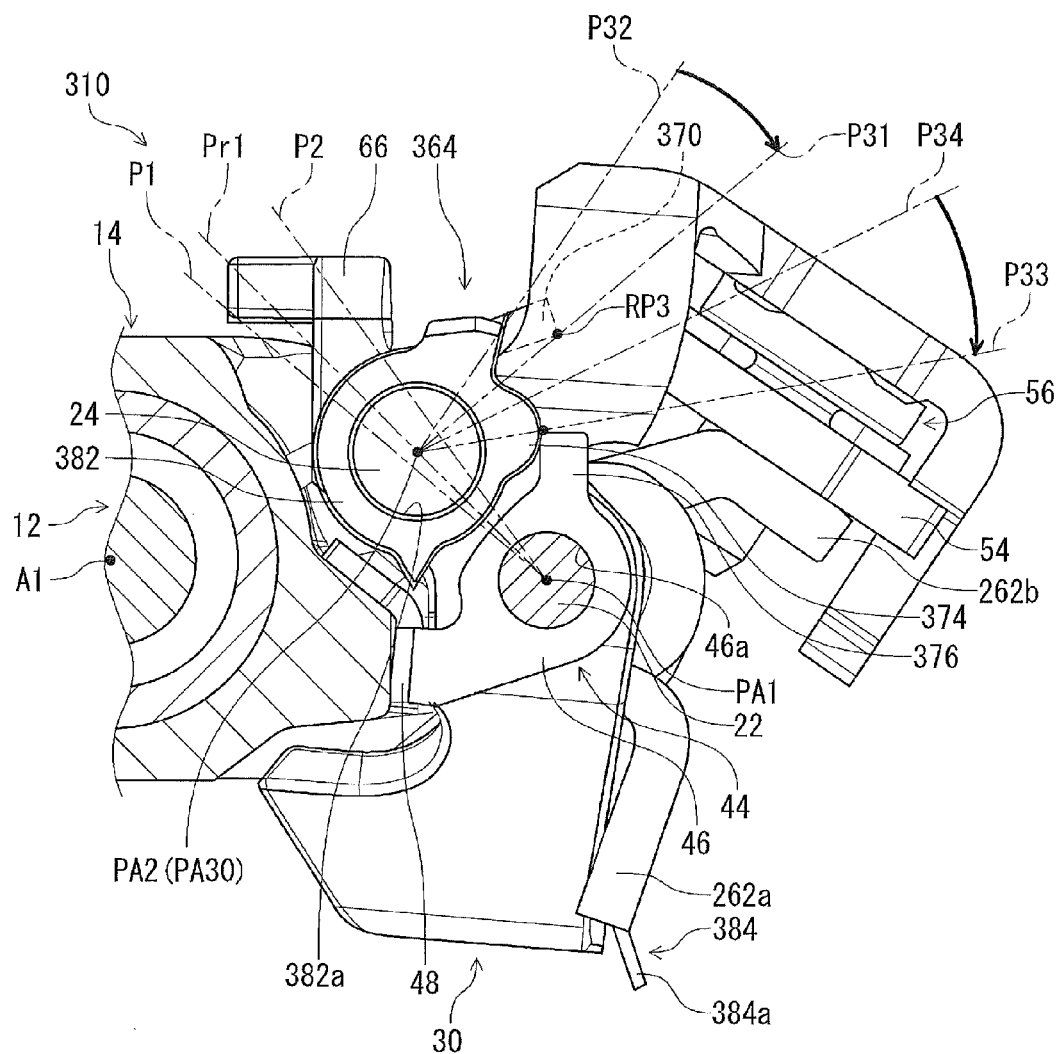
FIG. 21 is a partial enlarged cross-sectional view of the bicycle pedal illustrated in FIG. 17 for explaining an operation of the bicycle pedal.

As seen in FIG. 21, the first restricting part 374 is contactable with the second restricting part 376 to restrict the first sub member 16 from pivoting relative to the pedal body 14 about the first pivot axis PA1 in a state where the first restricting part 374 is disposed at the restricting position P33. The first restricting part 374 and the second restricting part 376 restricts the first sub member 16 from pivoting relative to the pedal body 14 about the first pivot axis PA1 toward the second position P2 in the state where the first restricting part 374 is disposed at the restricting position P33.

Figure 22:
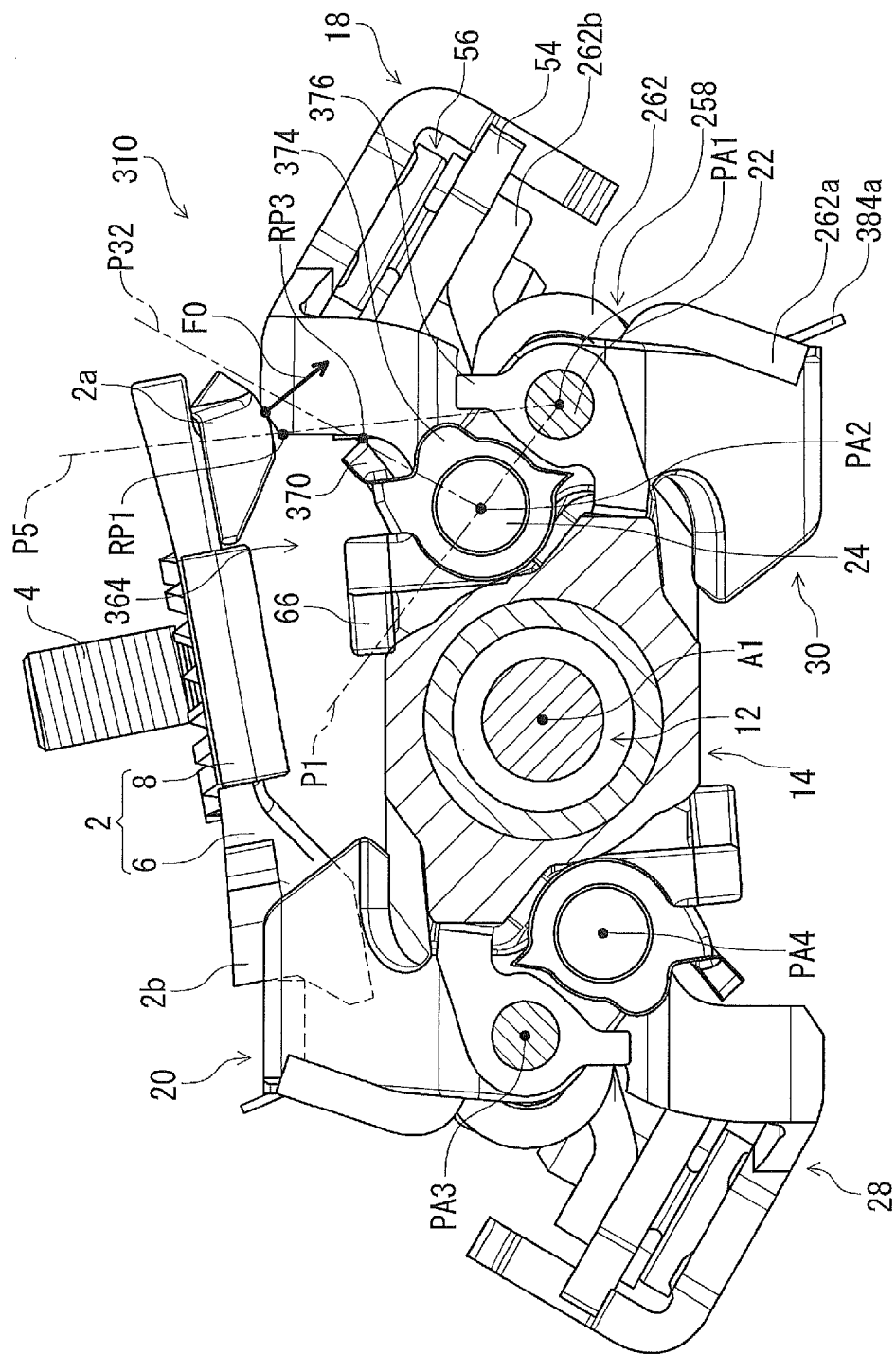
FIG. 22 is a partial enlarged cross-sectional view of the bicycle pedal illustrated in FIG. 17 for explaining a step-in operation of the bicycle pedal.
Figure 23:
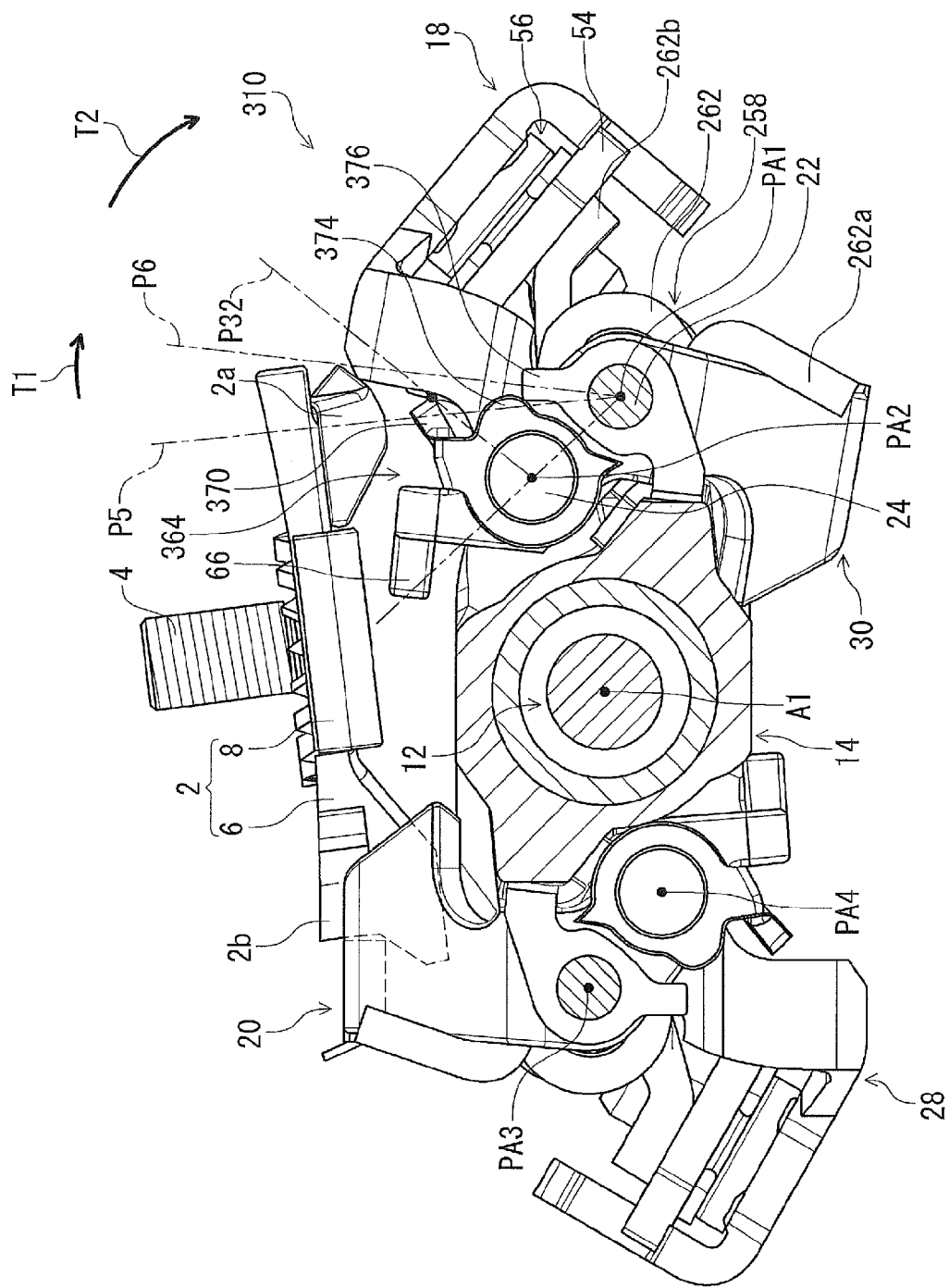
FIG. 23 is a partial enlarged cross-sectional view of the bicycle pedal illustrated in FIG. 17 for explaining the step-in operation of the bicycle pedal.

As seen in FIG. 22, the second pressed portion 370 is disposed at a position such that, in a step-in operation of the bicycle pedal 10, the first clamping member 18 comes into contact with the cleat 2 before the second pressed portion 370 comes into contact with the cleat 2. As seen in FIG. 23, when the rear end 2a of the cleat 2 is pressed against the first clamping member 18, the first clamping member 18 pivots relative to the pedal body 14 about the first pivot axis PA1 together with the first sub member 16 toward the sixth position P6. At this time, the first clamping member 18 is not pivoted relative to the first sub member 16 about the second pivot axis PA2 since the first torque T1 is less than the second torque T2.

Figure 24:
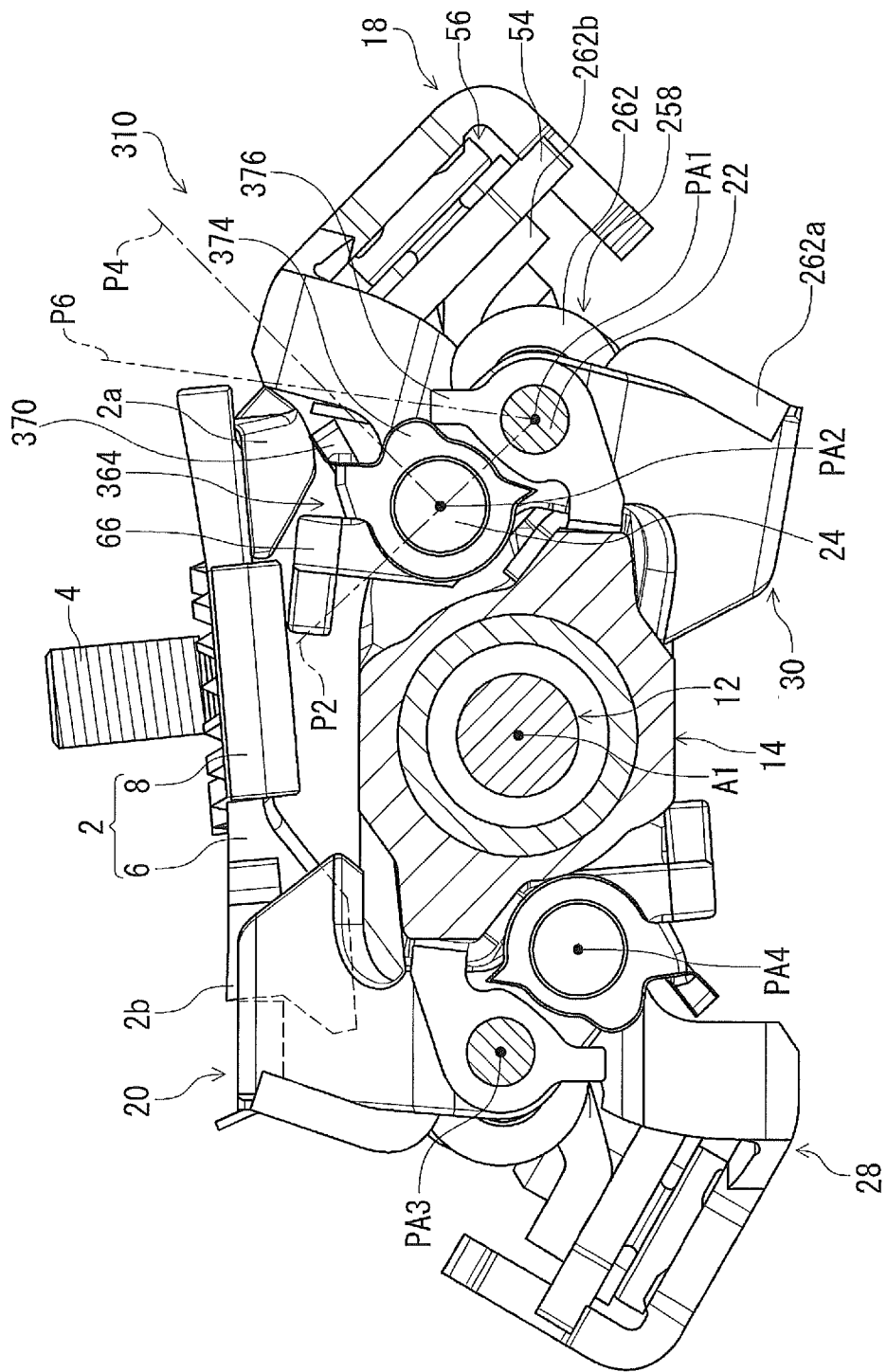
FIG. 24 is a partial enlarged cross-sectional view of the bicycle pedal illustrated in FIG. 17 for explaining the step-in operation of the bicycle pedal.

As seen in FIG. 23, the first restricting part 374 comes into contact with the second restricting part 376 before the first clamping member 18 reaches the sixth position P6. In this state, the first pressed portions 66 and the second pressed portion 370 are spaced apart from the cleat 2 and do not contact the cleat 2. The first sub member 16 is restricted from pivoting relative to the pedal body 14 about the second pivot axis PA2 toward the second position P2 in a state where the first restricting part 374 contacts the second restricting part 376. Thus, as seen in FIG. 24, the first clamping member 18 pivots relative to the pedal body 14 and the first sub member 16 about the second pivot axis PA2 toward the fourth position P4. In the state shown in FIG. 24, the cleat 2 comes into contact with the first pressed portions 66 and the second pressed portion 370.

However, the cleat 2 can contact the first pressed portions 66 and the second pressed portion 370 just before or almost at the same time as the finishing of the step-in operation, in order to reduce a required torque to move the first clamping member 18. In such an embodiment, the first restricting part 374 does not contact the second restricting part 376 until the finishing the step-in operation. In other words, the first clamping member 18 can pivot relative to the pedal body 14 substantially only about the first pivot axis PA1 without pivoting about the second pivot axis PA2 during the step-in operation of the bicycle pedal 10. Namely, the first clamping member 18 can be configured to pivot relative to the pedal body 14 toward the sixth position P6 about only the first pivot axis PA1 during the step-in operation of the bicycle pedal 10.

Figure 25:
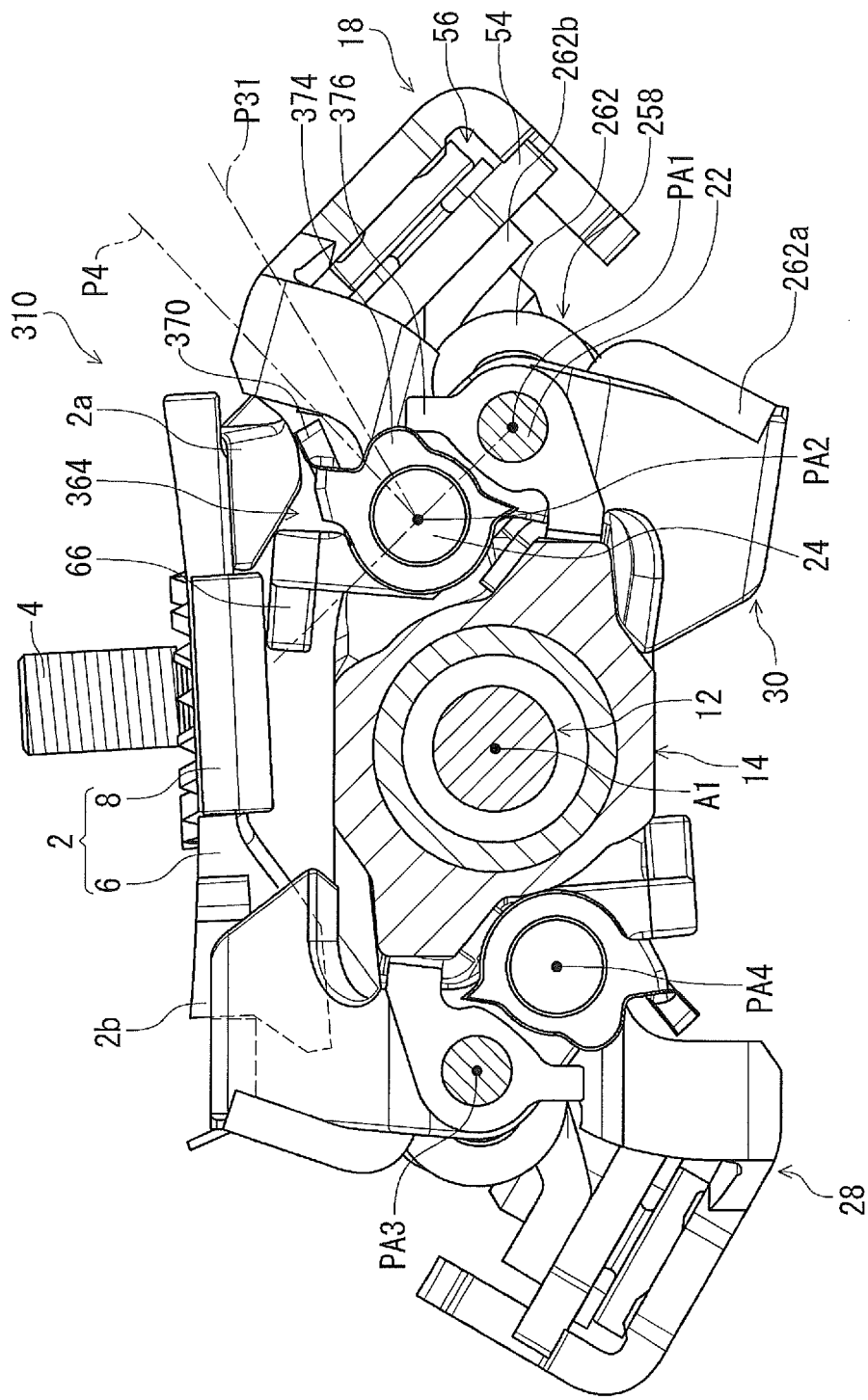
FIG. 25 is a partial enlarged cross-sectional view of the bicycle pedal illustrated in FIG. 17 for explaining the step-in operation of the bicycle pedal.

As seen in FIG. 25, the first pressed portions 66 are pressed by the cleat 2 so that the first sub member 16 pivots relative to the pedal body 14 about the first pivot axis PA1 toward the first position P1. The second pressed portion 370 is pressed by the cleat 2 to pivot relative to the pedal body 14 about the second pivot axis PA2 toward the pressed position P31.

Figure 26:
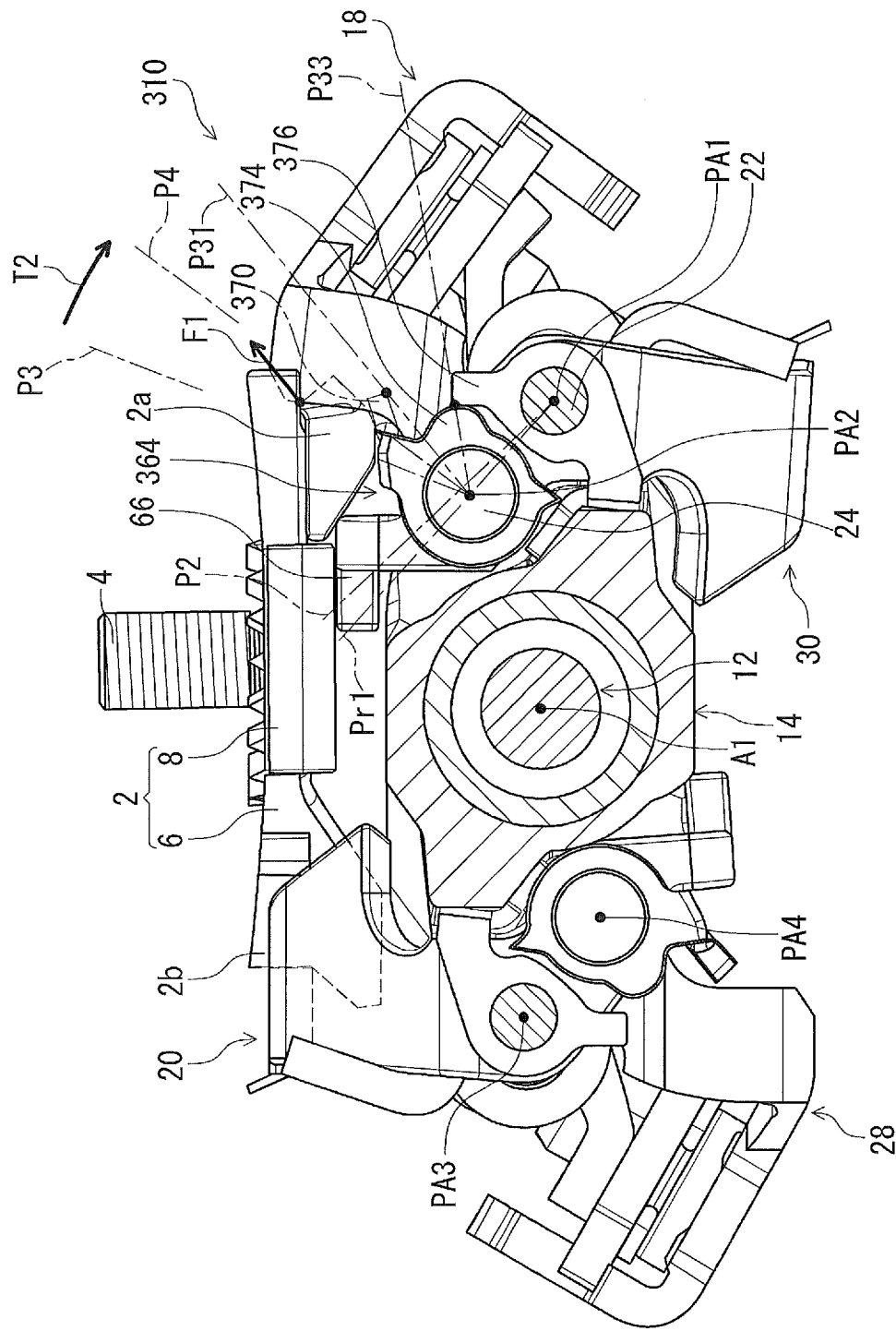
FIG. 26 is a partial enlarged cross-sectional view of the bicycle pedal illustrated in FIG. 17 for explaining the step-in operation of the bicycle pedal.

As seen in FIG. 26, the first pressed portions 66 are pressed by the cleat 2 in a state where the first clamping member 18 and the second clamping member 20 clamp the cleat 2. Furthermore, the second pressed portion 370 is pressed by the cleat 2 in the state where the first clamping member 18 and the second clamping member 20 clamp the cleat 2. In this state, the first sub member 16 is restricted from pivoting relative to the pedal body 14 about the first pivot axis PA1 toward the second position P2. Also, the first restricting part 374 is positioned at the restricting position P33 relative to the first sub member 16 to contact the second restricting part 376.

During a step-out operation (an operation where the user releases the cleat 2 of the shoe from the bicycle pedal 310), for example, the user (e.g., a rider) twists the shoe about a vertical axis to apply the removing force F1 via the cleat 2 to the first clamping member 18. When the rider twist the shoe in a state where the second pressed portion 370 is pressed by the cleat 2, the cleat 2 slides with the second pressed portion 370 so that the first restricting part 374 contacts the second restricting part 376 to restrict the first sub member 16 from pivoting relative to the pedal body 14 about the first pivot axis PA1. Thus, the restricting structure 364 restricts the first sub member 16 from pivoting relative to the pedal body 14 about the first pivot axis PA1 toward the second position P2. Accordingly, the first clamping member 18 is configured to pivot relative to the first sub member 16 toward the fourth position P4 about only the second pivot axis PA2 during the step-out operation of the bicycle pedal 10.

With the bicycle pedal 310, the second torque T2 is needed to pivot the first clamping member 18 about the second pivot axis PA2 toward the fourth position P4 in the step-out operation of the bicycle pedal 310. On the other hand, the first torque T1 is needed to pivot the first sub member 16 (the first clamping member 18) about the first pivot axis PA1 toward the second position P2 in the step-in operation. Since the first torque T1 is less than the second torque T2, it is possible to make the step-in operation easier for the user while the cleat 2 is strongly held by the bicycle pedal 310 so that the cleat 2 is prevented from being unintentionally released from the bicycle pedal 310.

In the illustrated embodiment, the restricting structure 364 includes the first pressed portions 66 and the second pressed portion 370. However, the first pressed portions 66 can be omitted from the bicycle pedal 310 if needed and/or desired. Even in such an embodiment, it is possible to obtain substantially the same advantageous effect as that of the bicycle pedal 310 including the first pressed portions 66 and the second pressed portion 370.

Fourth Embodiment

A bicycle pedal 410 in accordance with a fourth embodiment will be described below referring to FIGS. 27 to 36. The bicycle pedal 410 has the same configuration as the bicycle pedal 10 except for the restricting structure 64. Thus, elements having substantially the same function as those in the above embodiments will be numbered the same here, and will not be described and/or illustrated again in detail here for the sake of brevity.

Figure 27:
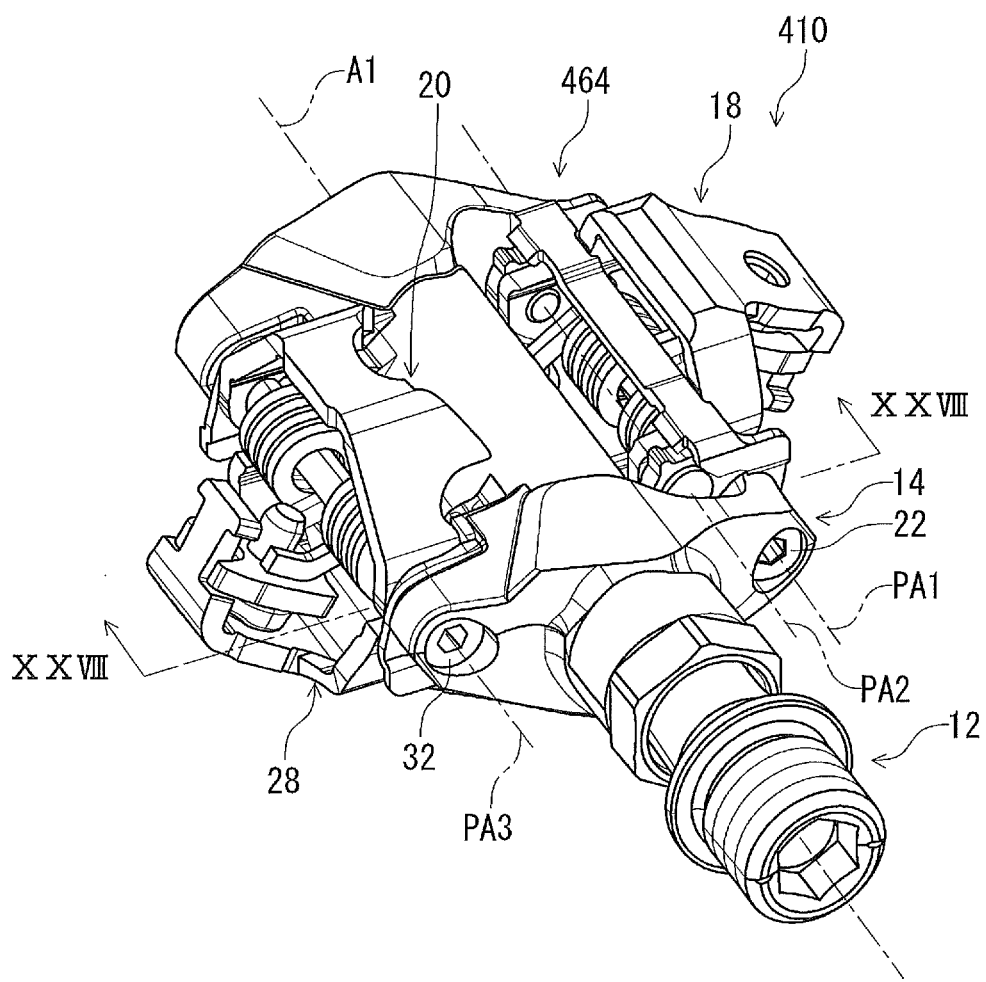
FIG. 27 is a perspective view of a bicycle pedal in accordance with a fourth embodiment.
Figure 28:
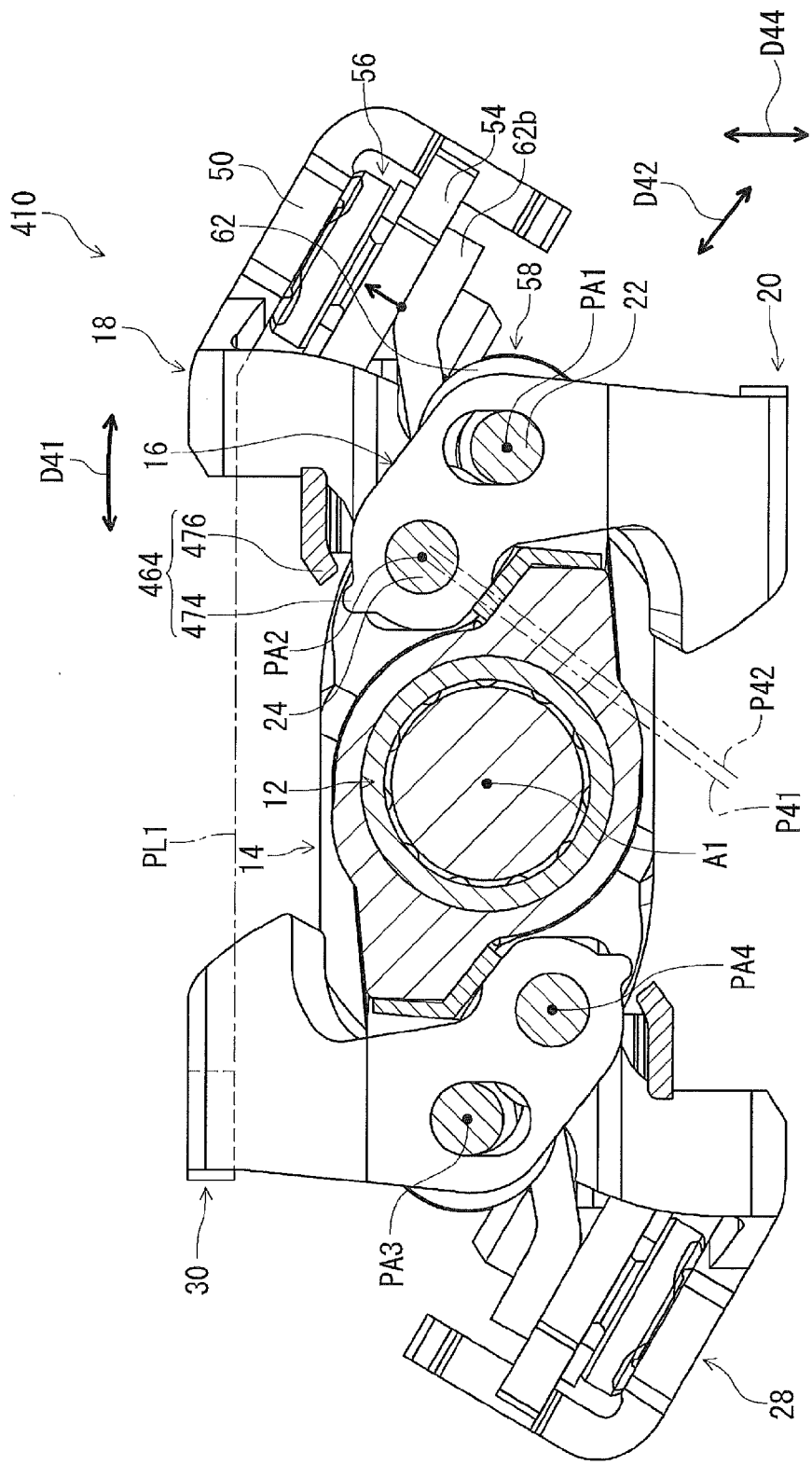
FIG. 28 is a cross-sectional view of the bicycle pedal taken along line XXVIII-XXVIII of FIG. 27 for explaining an operation of the bicycle pedal.

As seen in FIGS. 27 and 28, the bicycle pedal 410 comprises a restricting structure 464 configured to restrict the first sub member 16 from pivoting about the first pivot axis PA1 relative to the pedal body 14 toward the second position P2. As seen in FIG. 28, the first sub member 16 is pivotable relative to the pedal body 14 about the first pivot axis PA1 in a pivot direction D41. The first sub member 16 is movable relative to the pedal body 14 in a movement direction D42 between an engaging position P41 and a disengaging position P42. In the illustrated embodiment, the engaging position P41 and the disengaging position P42 are defined based on the second pivot axis PA2.

As seen in FIG. 28, the movement direction D42 is different from the pivot direction D41. The movement direction D42 is perpendicular to the first pivot axis PA1. The movement direction D42 is inclined relative to a cleat attachment plane PL1 defined by the first clamping member 18 and the second clamping member 20. However, the movement direction D42 can be perpendicular to the cleat attachment plane PL1 if needed and/or desired.

Figure 29:
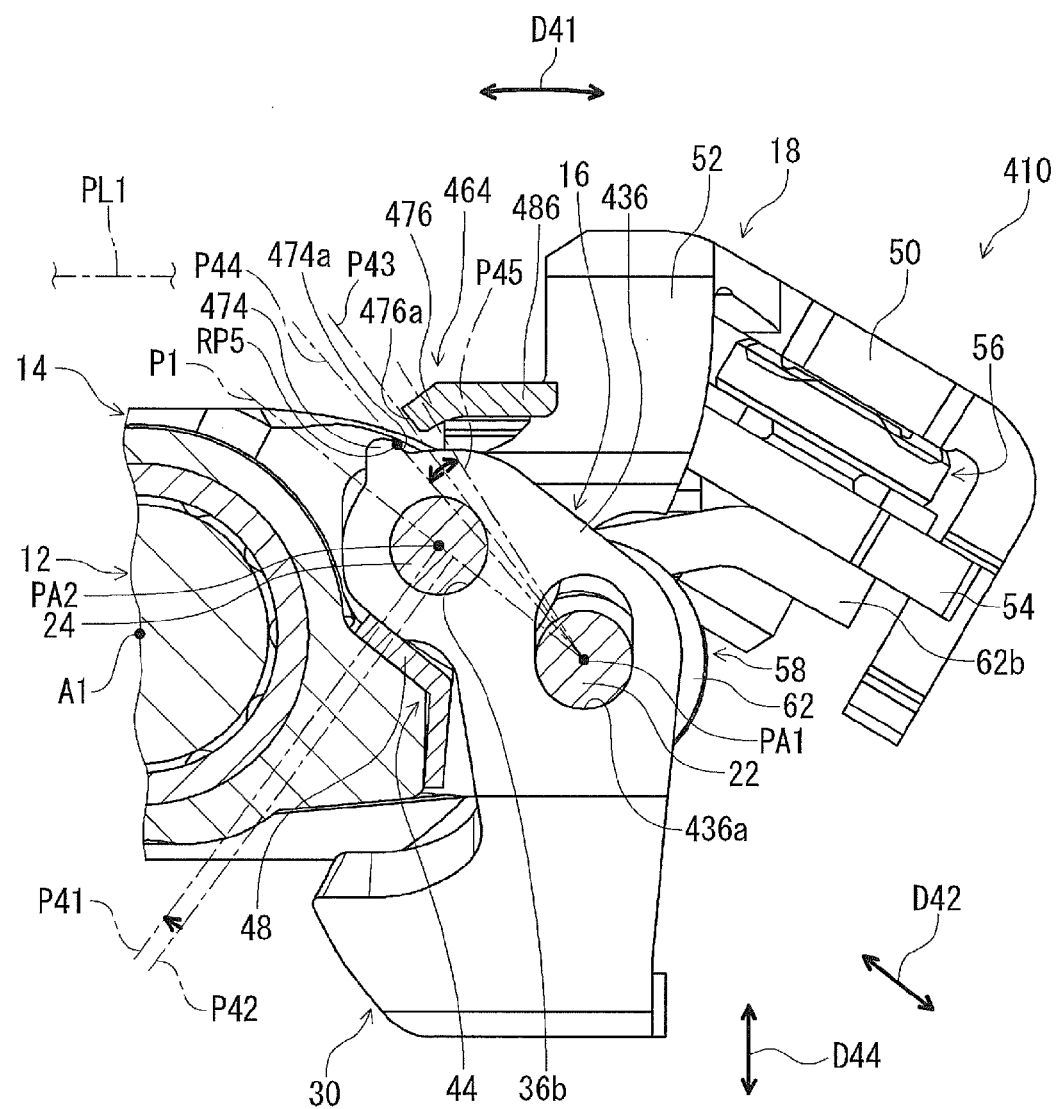
FIG. 29 is a partial enlarged cross-sectional view of the bicycle pedal illustrated in FIG. 27 for explaining the operation of the bicycle pedal.
Figure 30:
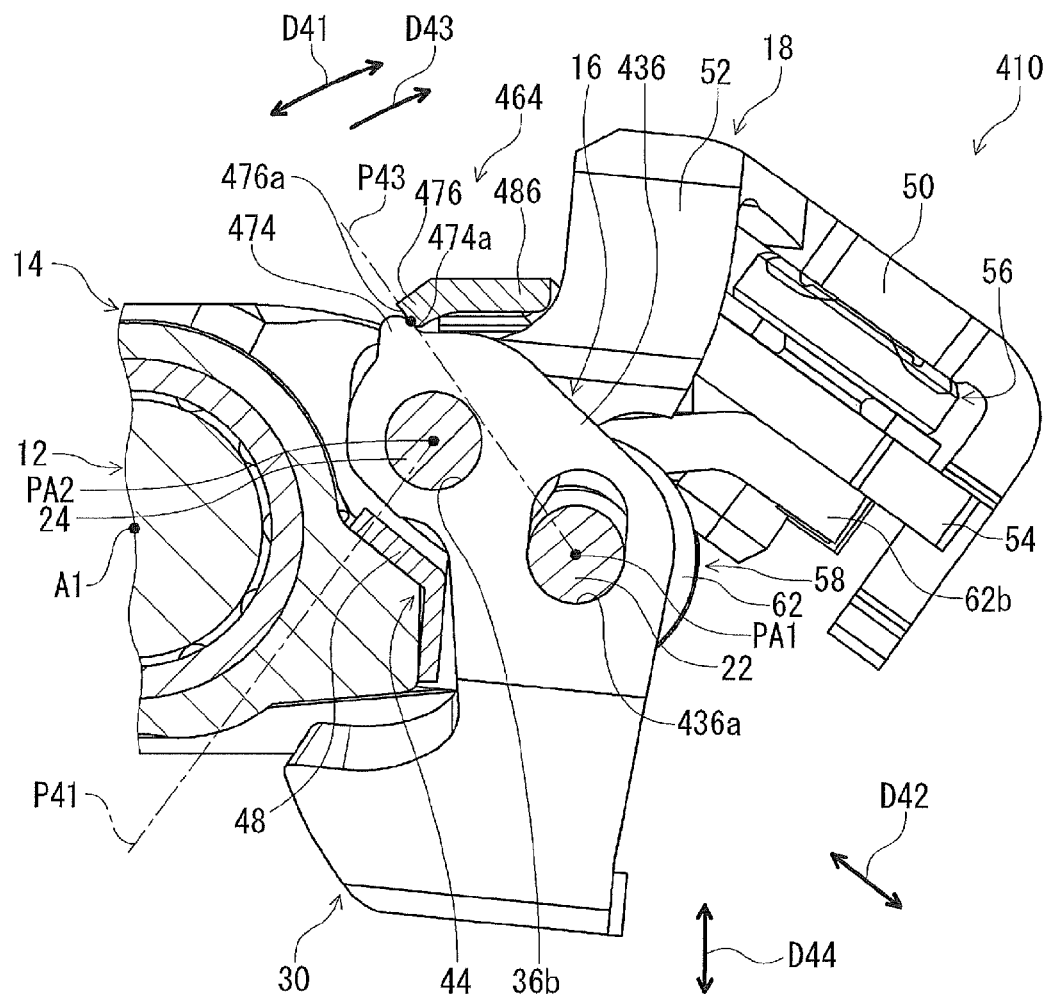
FIG. 30 is a partial enlarged cross-sectional view of the bicycle pedal illustrated in FIG. 27 for explaining the operation of the bicycle pedal.

As seen in FIGS. 29 and 30, the restricting structure 464 restricts the first sub member 16 from pivoting relative to the pedal body 14 about the first pivot axis PA1 in a state where the first sub member 16 is disposed at the engaging position P41. In the illustrated embodiment, as seen in FIG. 30, the restricting structure 464 restricts the first sub member 16 from pivoting relative to the pedal body 14 about the first pivot axis PA1 from a restricted pivot position P43 in a first pivot direction D43 in the state where the first sub member 16 is disposed at the engaging position P41. The first pivot direction D43 is one of directions included in the pivot direction D41.

Figure 31:
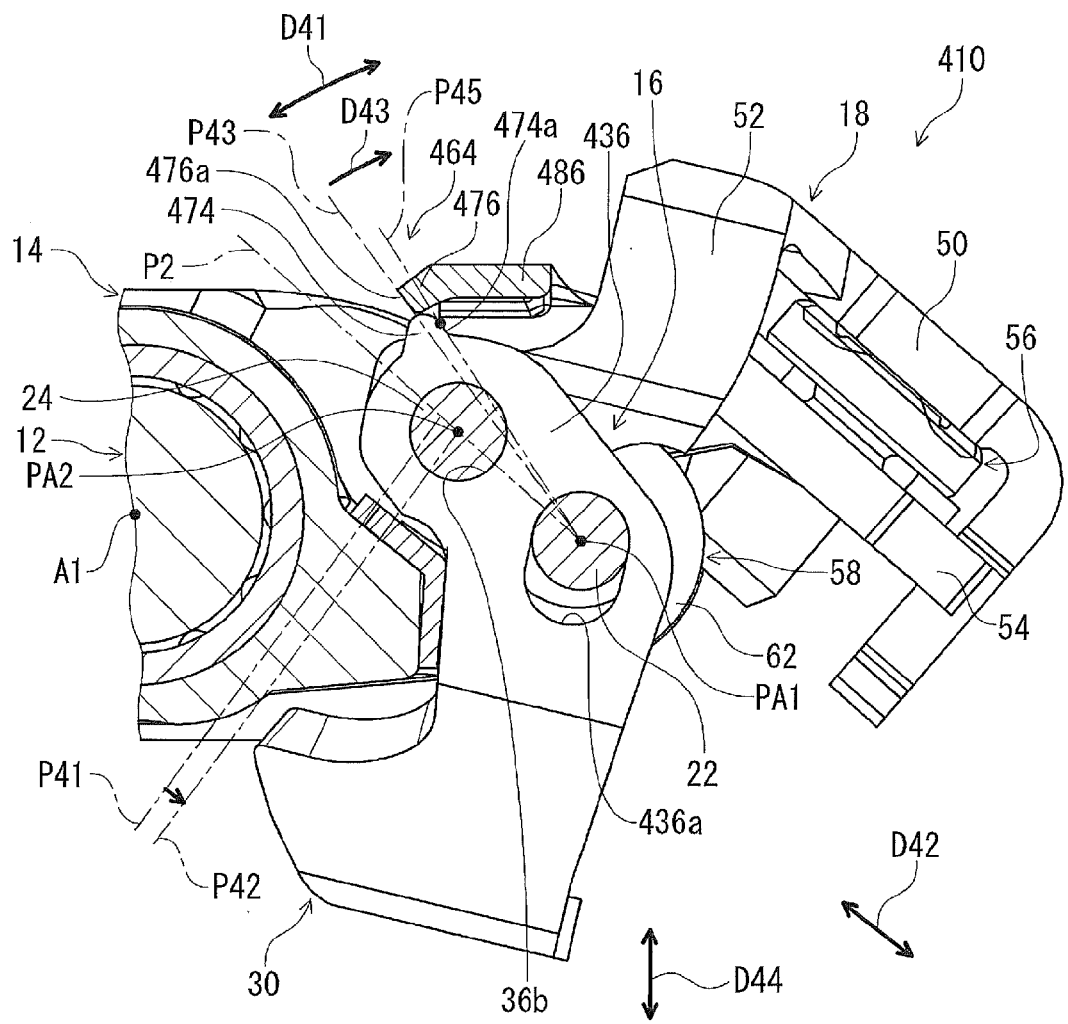
FIG. 31 is a partial enlarged cross-sectional view of the bicycle pedal illustrated in FIG. 27 for explaining the operation of the bicycle pedal.

As seen in FIG. 31, the restricting structure 464 allows the first sub member 16 to pivot relative to the pedal body 14 about the first pivot axis PA1 in a state where the first sub member 16 is disposed at the disengaging position P42. In the illustrated embodiment, the restricting structure 464 allows the first sub member 16 to pivot relative to the pedal body 14 about the first pivot axis PA1 from the restricted pivot position P43 in the first pivot direction D43 in the state where the first sub member 16 is disposed at the disengaging position P42.

As seen in FIGS. 28 to 31, the restricting structure 464 includes a first restricting part 474 and a second restricting part 476. The first restricting part 474 is provided on the first sub member 16 to be movable integrally with the first sub member 16 relative to the pedal body 14 in the movement direction D42. In the illustrated embodiment, the first restricting part 474 protrudes from the first sub member 16.

Figure 32:
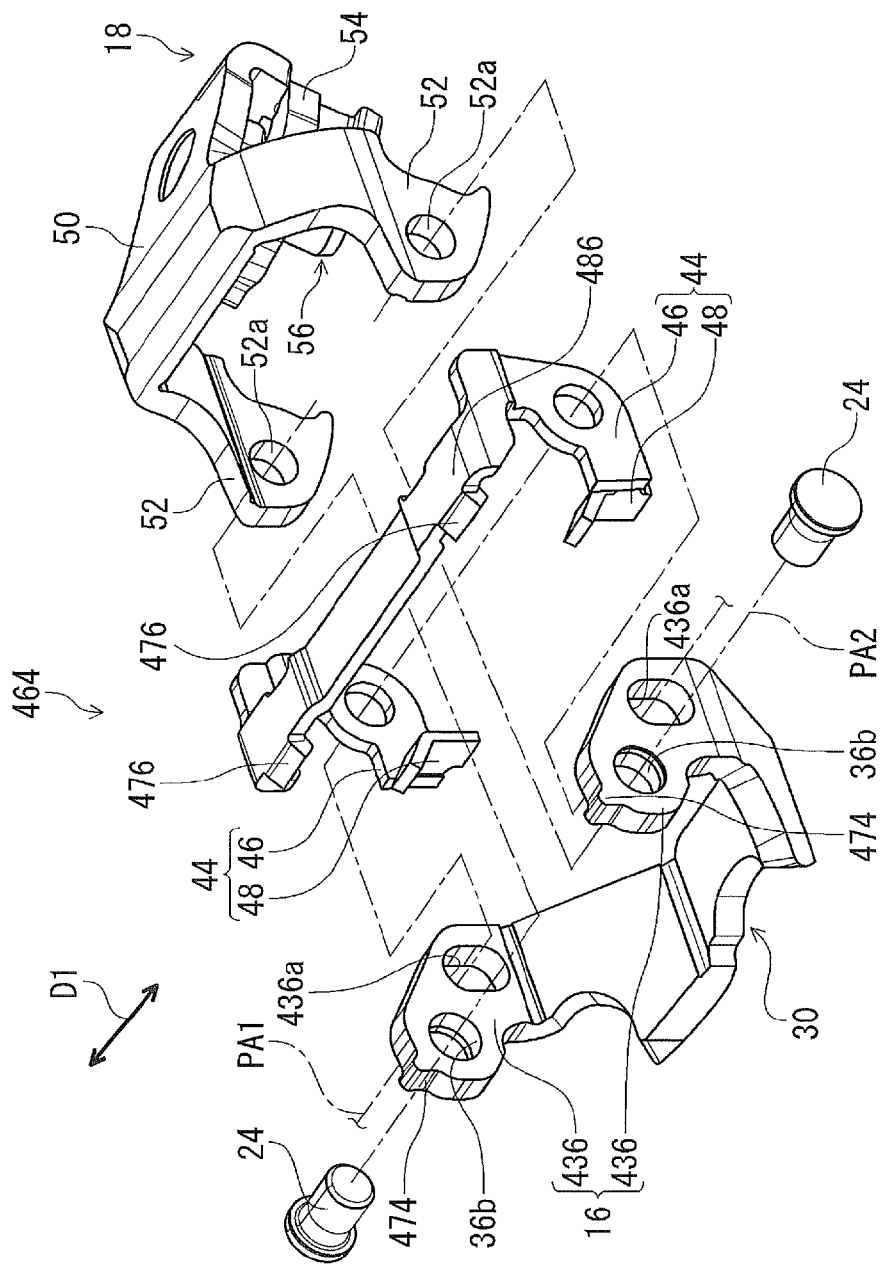
FIG. 32 is a partial exploded perspective view of the bicycle pedal illustrated in FIG. 27.

As seen in FIG. 32, the restricting structure 464 includes a pair of first restricting parts 474. The first sub member 16 includes a pair of coupling portions 436 instead of the coupling portions 36 in accordance with the first embodiment. The first restricting parts 474 are respectively provided on the coupling portions 436 of the first sub member 16. The first restricting parts 474 respectively protrude from the coupling portions 436 toward an opposite side of the second pivot axis PA2. The first restricting parts 474 are spaced apart from each other in the axial direction D1.

Each of the coupling portions 436 includes the second pivot hole 36b in accordance with the first embodiment. In the bicycle pedal 410, however, the first sub member 16 includes an elongated hole 436a through which the first pivot shaft 22 (FIG. 27) extends. In the illustrated embodiment, each of the coupling portions 436 includes the elongated hole 436a instead of the first pivot hole 36a in accordance with the first embodiment.

As seen in FIG. 28, the first pivot shaft 22 is configured to guide the first sub member 16 via the elongated hole 436a to move relative to the pedal body 14 in the movement direction D42. In a state where the first sub member 16 is disposed at the first position P1 relative to the pedal body 14, the elongated hole 436a extends in a vertical direction D44 perpendicular to the cleat attachment plane PL1. However, the elongated hole 436a can be disposed to extend in a direction different from the vertical direction D44 if needed and/or desired. For example, the elongated hole 436a can be disposed to extend in the movement direction D42 in the state where the first sub member 16 is disposed at the first position P1 relative to the pedal body 14.

As seen in FIG. 32, the restricting structure 464 includes a pair of second restricting parts 476. The second restricting part 476 is integrally provided with the pedal body 14. In the illustrated embodiment, the restricting structure 464 further includes a restricting base body 486. The restricting base body 486 has a plate shape and extends in the axial direction D1. The restricting base body 486 couples the base parts 46 of the stoppers 44. The stoppers 44 are respectively provided at ends of the restricting base body 486. The base parts 46 protrude from the restricting base body 486. The second restricting parts 476 are provided on the restricting base body 486 and protrude from the restricting base body 486. The second restricting parts 476 are spaced apart from each other in the axial direction D1. The second restricting parts 476 are integrally provided with the pedal body 14 as a separate member from the pedal body 14. However, the second restricting part 376, the restricting base body 486, and the stoppers 44 can be integrally provided with the pedal body 14 as a single unitary member if needed and/or desired. The second restricting parts 476 as the separate members from the pedal body are configured not to move relative to the pedal body 14. However, the restricting parts 476 can slightly move relative to the pedal body 14 within a range where the restricting structure 464 can restrict the first sub member 16 from pivoting relative to the pedal body 14 about the first pivot axis PA1.

As seen in FIG. 30, the first restricting part 474 is configured to engage with the second restricting part 476 to restrict the first sub member 16 from pivoting relative to the pedal body 14 about the first pivot axis PA1 in the state where the first sub member 16 is disposed at the engaging position P41. As seen in FIG. 31, the first restricting part 474 is configured to disengage from the second restricting part 476 to allow the first sub member 16 to pivot relative to the pedal body 14 about the first pivot axis PA1 in the state where the first sub member 16 is disposed at the disengaging position.

As seen in FIG. 29, the first restricting part 474 includes a first engaging surface 474a. The second restricting part 476 includes a second engaging surface 476a contactable with the first engaging surface 474a. The first engaging surface 474a is pivotable relative to the pedal body 14 about the first pivot axis PA1 between a first pivot position P44 and a second pivot position P45. The first pivot position P44, the second pivot position P45, and the restricted pivot position P43 are defined based on a reference point RP5.

As seen in FIG. 29, the first engaging surface 474a is disposed at the first pivot position P44 in a state where the first sub member 16 is disposed at the first position P1. The second engaging surface 476a is disposed on a passageway defined from the first pivot position P44 in the first pivot direction D43. As seen in FIG. 31, the first engaging surface 474a is disposed at the second pivot position P45 in a state where the first sub member 16 is disposed at the second position P2. In the illustrated embodiment, the first position P1 and the second position P2 are defined based on the first pivot axis PA1 and the second pivot axis PA2.

As seen in FIG. 29, the biasing structure 58 is configured to bias the first sub member 16 toward the engaging position P41. More specifically, the biasing force F11 is applied to the first clamping member 18 from the biasing structure 58 as well as the bicycle pedal 10 in accordance with the first embodiment. Since the first sub member 16 includes the elongated holes 436a through which the first pivot shaft 22 extends, the first clamping member 18 and the first sub member 16 are shifted along the elongated holes 436a toward the restricting base body 486. Furthermore, the first sub member 16 (the coupling portions 436) is pressed against the contact parts 48 of the stoppers 44 by the biasing force F11. Accordingly, the first sub member 16 is positioned at the engaging position P41 in a state where the cleat 2 is clamped between the first clamping member 18 and the second clamping member 20.

Figure 33:
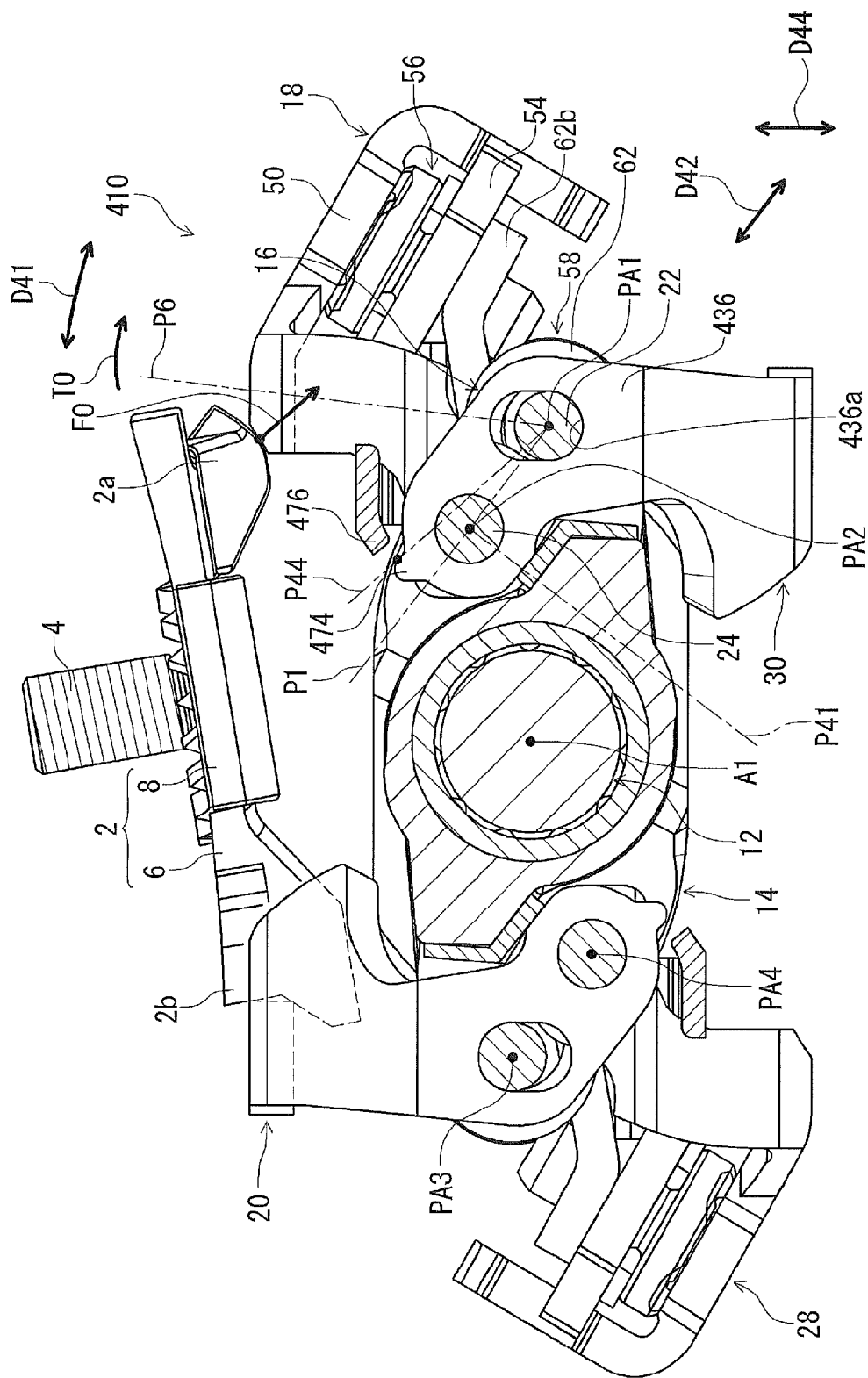
FIG. 33 is a cross-sectional view of the bicycle pedal illustrated in FIG. 27 for explaining a step-in operation of the bicycle pedal.

As seen in FIG. 33, in a step-in operation of the bicycle pedal 410, the first clamping member 18 pivots relative to the pedal body 14 about the first pivot axis PA1 together with the first sub member 16 in response to the actuating torque T0. The first clamping member 18 pivots relative to the pedal body 14 about the first pivot axis PA1 toward the sixth position P6. At this time, the first clamping member 18 is not pivoted relative to the first sub member 16 about the second pivot axis PA2 since the first torque T1 is less than the second torque T2.

Figure 34:
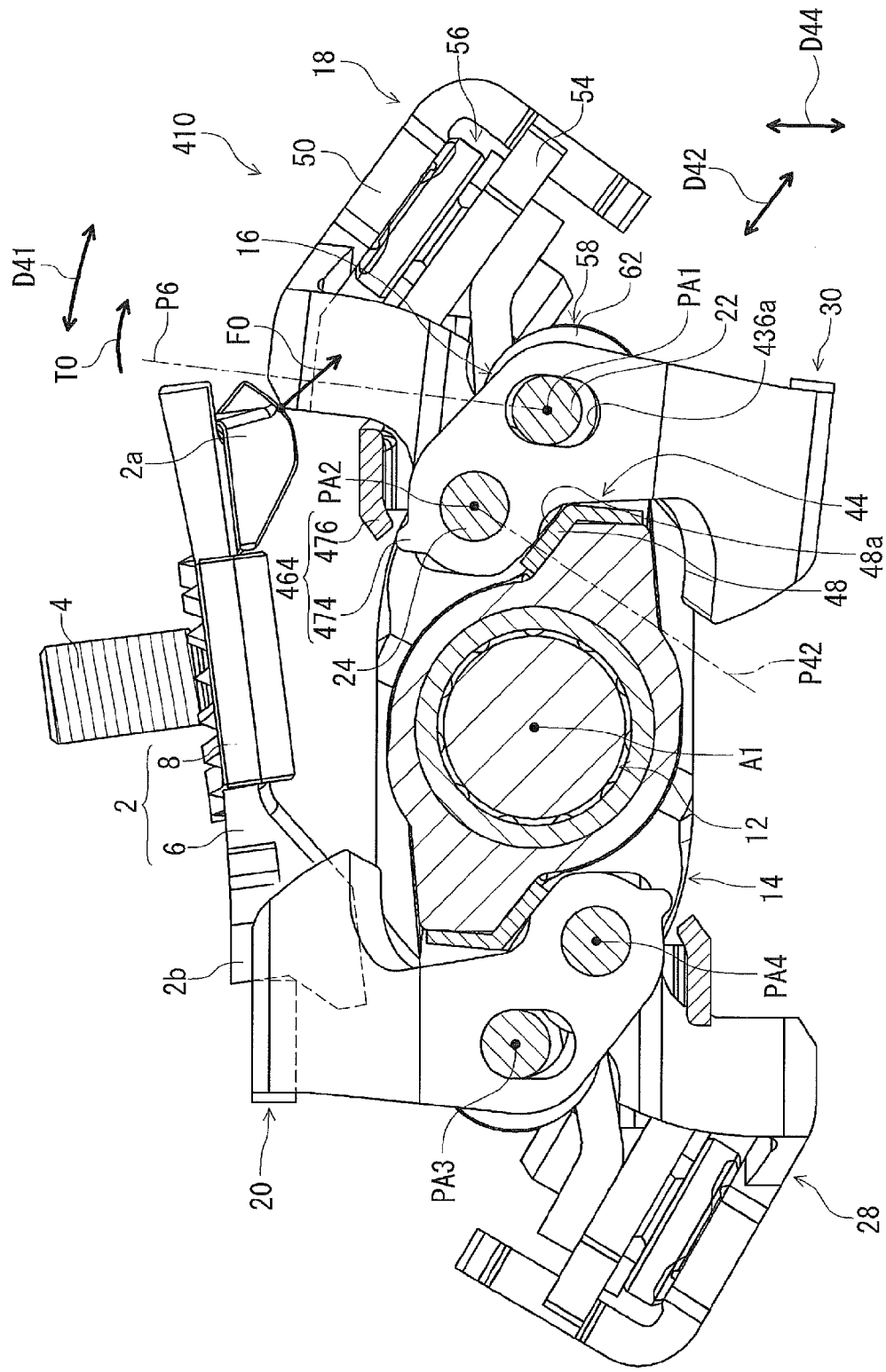
FIG. 34 is a cross-sectional view of the bicycle pedal illustrated in FIG. 27 for explaining the step-in operation of the bicycle pedal.

As seen in FIG. 34, the first sub member 16 is movable relative to the pedal body 14 toward the disengaging position P42 in the movement direction D42 in response to the actuating force F0 applied to the first clamping member 18 in the step-in operation of the bicycle pedal 410. More specifically, in response to the actuating force F0 applied to the first clamping member 18, the first sub member 16 moves relative to the pedal body 14 toward the disengaging position P42 in the movement direction D42 with pivoting relative to the pedal body 14 about the first pivot axis PA1. The first sub member 16 is configured to move rearward and downward relative to the pedal body 14 in response to the actuating force F0 applied to the first clamping member 18 in the step-in operation of the bicycle pedal 410. In the illustrated embodiment, the first sub member 16 (the coupling portion 436) slides with the contact parts 48 of the stoppers 44. The contact parts 48 of the stoppers 44 are configured to guide the first sub member 16 in the movement direction D42. The first sub member 16 moves relative to the pedal body 14 along the first receiving surfaces 48a of the contact parts 48.

Figure 35:
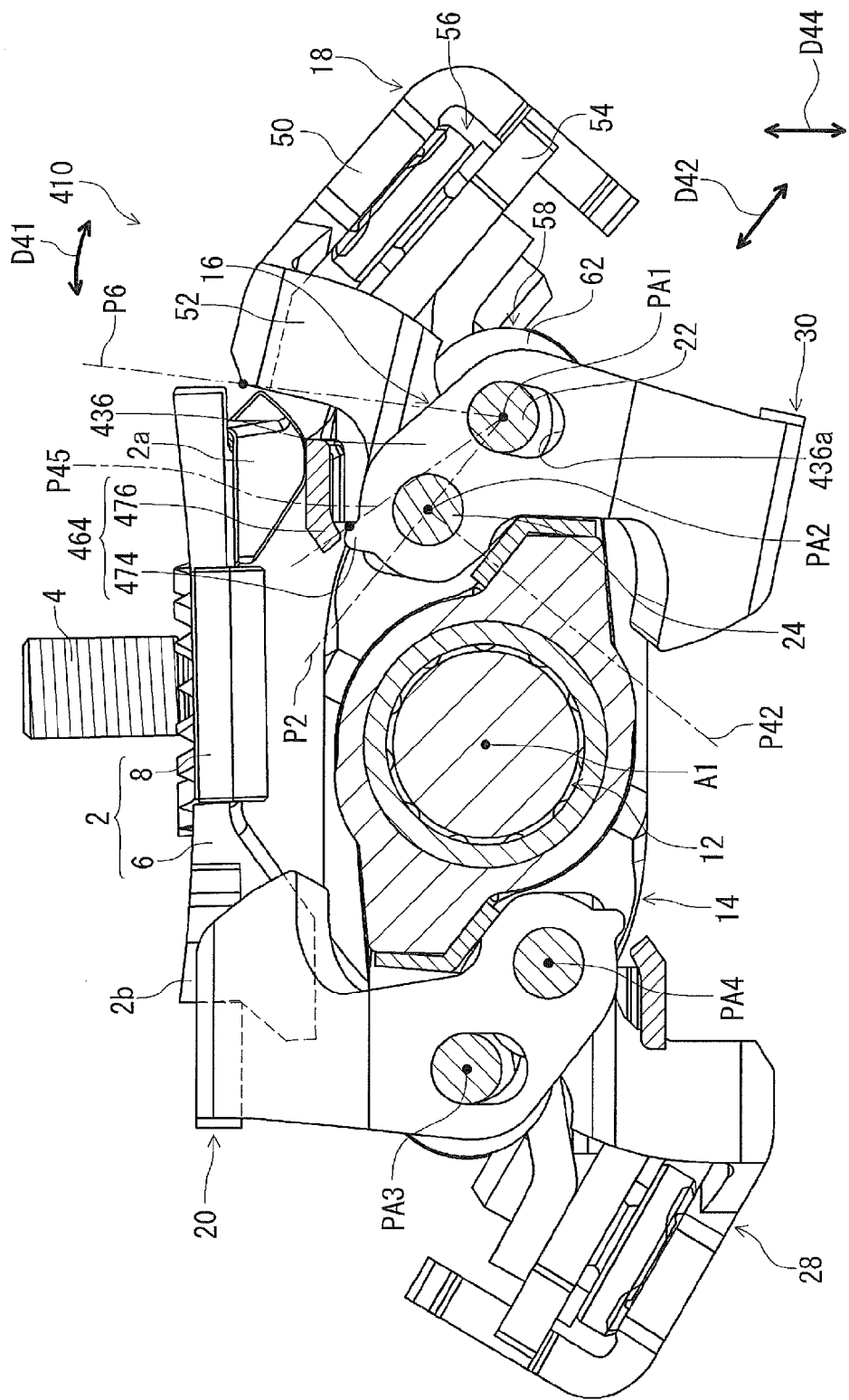
FIG. 35 is a cross-sectional view of the bicycle pedal illustrated in FIG. 27 for explaining the step-in operation of the bicycle pedal.

As seen in FIG. 35, in a state where the first sub member 16 is positioned at the disengaging position P42 relative to the pedal body 14, the first restricting part 474 is movable relative to the second restricting part 476 toward the second pivot position P45 without being prevented from moving by the second restricting part 476. Accordingly, the first clamping member 18 is configured to pivot relative to the pedal body 14 toward the sixth position P6 about only the first pivot axis PA1 during the step-in operation of the bicycle pedal 410.

Figure 36:
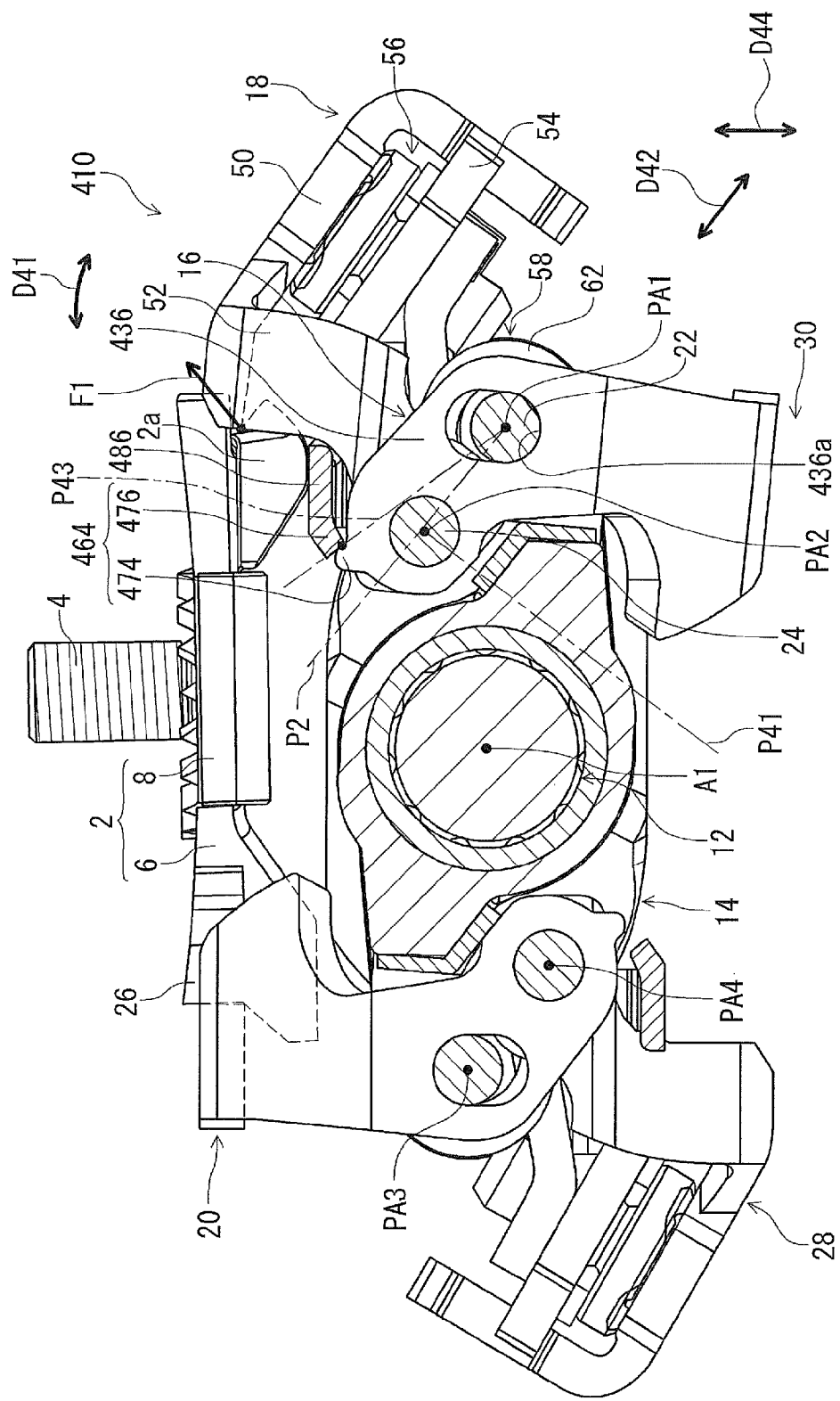
FIG. 36 is a cross-sectional view of the bicycle pedal illustrated in FIG. 27 for explaining the step-in operation of the bicycle pedal.

As seen in FIG. 36, when the first clamping member 18 is further pressed by the cleat 2, the cleat 2 is clamped between the first clamping member 18 and the second clamping member 20, and the first sub member 16 is returned to the engaging position P41 by the biasing force of the biasing structure 58. In this state, the first restricting part 474 is positioned at the restricted pivot position P43 to contact the second restricting part 476 or to be adjacent to the second restricting part 476. Thus, the first sub member 16 is restricted from pivoting relative to the pedal body 14 about the first pivot axis PA1 toward the second position P2.

As seen in FIG. 36, the removing force F1 is applied to the first clamping member 18 from the cleat 2 during the step-out operation of the bicycle pedal 410. With the bicycle pedal 410, however, the restricting structure 464 restricts the first sub member 16 from pivoting relative to the pedal body 14 about the first pivot axis PA1 toward the second position P2. Accordingly, in the step-out operation, the first clamping member 18 pivots relative to the pedal body 14 about the second pivot axis PA2 toward the fourth position P4 in the state where the cleat 2 is clamped between the first clamping member 18 and the second clamping member 20. Namely, the first clamping member 18 is configured to pivot relative to the first sub member 16 toward the fourth position P4 about only the second pivot axis PA2 during the step-out operation of the bicycle pedal 410.

With the bicycle pedal 410, the restricting structure 464 is configured to restrict the first sub member 16 from pivoting relative to the pedal body 14 about the first pivot axis PA1 toward the second position P2. Accordingly, it is possible to obtain substantially the same advantageous effect as that of the bicycle pedal 10 in accordance with the first embodiment.

In the present application, the term "attached" or "attaching", as used herein, can encompass configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle pedal comprising:
    a pedal axle;
    a pedal body rotatably supported on the pedal axle;
    a first sub member movably coupled to the pedal body, the first sub member being movable relative to the pedal body about a first pivot axis between a first position and a second position;
    a first clamping member movably coupled to the first sub member, the first clamping member being movable relative to the first sub member about a second pivot axis between a third position and a fourth position;
    a second clamping member coupled to the pedal body to clamp a cleat together with the first clamping member;
    a biasing structure configured to bias the first clamping member toward the third position and configured to bias the first sub member toward the first position, wherein the first sub member, the first pivot axis, the first clamping member, the second pivot axis and the biasing structure are configured such that a first torque to pivot the first sub member about the first pivot axis toward the second position is less than a second torque to pivot the first clamping member about the second pivot axis toward the fourth position; and
    a restricting structure configured to restrict the first sub member from pivoting about the first pivot axis relative to the pedal body toward the second position.

2. The bicycle pedal according to claim 1, further comprising:
    a third clamping member coupled to the pedal body and provided on an opposite side of the first clamping member relative to the pedal body; and
    a fourth clamping member coupled to the pedal body to clamp a cleat together with the third clamping member, wherein
    the first sub member is integrally provided with the fourth clamping member.

3. The bicycle pedal according to claim 1, wherein
    the first pivot axis is farther from the pedal axle than the second pivot axis.

4. The bicycle pedal according to claim 1, wherein
    the biasing structure includes
    a first biasing member configured to bias the first clamping member relative to the pedal body toward the third position, and
    a second biasing member configured to bias the first clamping member relative to the first sub member toward the third position.

5. The bicycle pedal according to claim 4, wherein
    the first biasing member includes
    a first end configured to engage with the pedal body, and
    a second end configured to engage with the first clamping member, and the second biasing member includes
    a third end configured to engage with the first sub member, and
    a fourth end configured to engage with the first clamping member.

6. The bicycle pedal according to claim 1, wherein
    the restricting structure includes a first pressed portion configured to be pressed by the cleat so that the first sub member is restricted from pivoting relative to the pedal body about the first pivot axis toward the second position.

7. The bicycle pedal according to claim 6, wherein
    the first pressed portion is pressed by the cleat in a state where the first clamping member and the second clamping member clamp the cleat, and
    the first pressed portion is disposed at a position such that, in a step-in operation of the bicycle pedal, the first clamping member comes into contact with the cleat before the first pressed portion comes into contact with the cleat.

8. The bicycle pedal according to claim 6, wherein
    the first pressed portion is provided on the first sub member and is pivotable integrally with the first sub member about the first pivot axis.

9. The bicycle pedal according to claim 8, wherein
    the first pressed portion protrudes from the first sub member away from the second pivot axis.

10. The bicycle pedal according to claim 1, wherein
    the restricting structure includes a pressed portion configured to be pressed by the cleat so that the first sub member is restricted from pivoting relative to the pedal body about the first pivot axis toward the second position.

11. The bicycle pedal according to claim 10, wherein
    the pressed portion is pressed by the cleat in a state where the first clamping member and the second clamping member clamp the cleat, and
    the pressed portion is disposed at a position such that, in a step-in operation of the bicycle pedal, the first clamping member comes into contact with the cleat before the pressed portion comes into contact with the cleat.

12. The bicycle pedal according to claim 10, wherein
the pressed portion is movable relative to the first sub member between
a pressed position at which the pressed portion is pressed by the cleat, and
a rest position at which the pressed portion is not pressed by the cleat,
the restricting structure restricts the first sub member from pivoting relative to the pedal body about the first pivot axis toward the second position in a state where the pressed portion is disposed at the pressed position, and
the restricting structure allows the first sub member to pivot relative to the pedal body about the first pivot axis toward the second position in a state where the pressed portion is disposed at the rest position.

13. The bicycle pedal according to claim 12, wherein
the biasing structure includes a third biasing member configured to bias the pressed portion to the rest position.

14. The bicycle pedal according to claim 12, wherein
the pressed portion is pivotable relative to the first sub member about an additional pivot axis between the pressed position and the rest position.

15. The bicycle pedal according to claim 14, wherein
the additional pivot axis coincides with the second pivot axis.

16. The bicycle pedal according to claim 14, wherein
the restricting structure includes
a first restricting part pivotable integrally with the pressed portion relative to the first sub member about the additional pivot axis between a restricting position and a release position, and
a second restricting part integrally provided with the pedal body,
the first restricting part is contactable with the second restricting part to restrict the first sub member from pivoting relative to the pedal body about the first pivot axis in a state where the first restricting part is disposed at the restricting position, and
the first restricting part is spaced apart from the second restricting part to allow the first sub member to pivot relative to the pedal body about the first pivot axis in a state where the first restricting part is disposed at the release position.

17. The bicycle pedal according to claim 1, wherein
the first sub member is pivotable relative to the pedal body about the first pivot axis in a pivot direction,
the first sub member is movable relative to the pedal body in a movement direction between an engaging position and a disengaging position, the movement direction being different from the pivot direction,
the restricting structure restricts the first sub member from pivoting relative to the pedal body about the first pivot axis in a state where the first sub member is disposed at the engaging position, and
the restricting structure allows the first sub member to pivot relative to the pedal body about the first pivot axis in a state where the first sub member is disposed at the disengaging position.

18. The bicycle pedal according to claim 17, wherein
the restricting structure includes
a first restricting part provided on the first sub member to be movable integrally with the first sub member relative to the pedal body in the movement direction, and
a second restricting part integrally provided with the pedal body,
the first restricting part is configured to engage with the second restricting part to restrict the first sub member from pivoting relative to the pedal body about the first pivot axis in the state where the first sub member is disposed at the engaging position, and
the first restricting part is configured to disengage from the second restricting part to allow the first sub member to pivot relative to the pedal body about the first pivot axis in the state where the first sub member is disposed at the disengaging position.

19. The bicycle pedal according to claim 17, wherein
the biasing structure is configured to bias the first sub member toward the engaging position.

20. The bicycle pedal according to claim 17, wherein
the first sub member is movable relative to the pedal body toward the disengaging position in the movement direction in response to an actuating force applied to the first clamping member in a step-in operation of the bicycle pedal.

21. The bicycle pedal according to claim 17, further comprising:
a first pivot shaft configured to pivotably support the first sub member about the first pivot axis, wherein
the first sub member includes an elongated hole through which the first pivot shaft extends, and
the first pivot shaft is configured to guide the first sub member via the elongated hole to move relative to the pedal body in the movement direction.

22. The bicycle pedal according to claim 21, wherein
the movement direction is perpendicular to the first pivot axis.

23. The bicycle pedal according to claim 21, wherein
the movement direction is inclined relative to a cleat attachment plane defined by the first clamping member and the second clamping member.

24. The bicycle pedal according to claim 23, wherein
the first sub member is configured to move rearward and downward relative to the pedal body in response to an actuating force applied to the first clamping member in a step-in operation of the bicycle pedal.

25. The bicycle pedal according to claim 1, wherein
the restricting structure is configured to restrict the first sub member from moving from a restricted position toward the second position.

26. A bicycle pedal comprising:
a pedal axle;
a pedal body rotatably supported on the pedal axle;
a first sub member movably coupled to the pedal body, the first sub member being movable relative to the pedal body about a first pivot axis between a first position and a second position;
a first clamping member movably coupled to the first sub member, the first clamping member being movable relative to the first sub member about a second pivot axis between a third position and a fourth position, the first clamping member being movable relative to the pedal body about the first pivot axis between a fifth position and a sixth position;
a second clamping member coupled to the pedal body to clamp a cleat together with the first clamping member; and
a biasing structure configured to bias the first clamping member toward the third position and configured to bias the first sub member toward the first position,
wherein the first sub member, the first pivot axis, the first clamping member, the second pivot axis and the biasing structure are configured such that a first torque to pivot the first sub member about the first pivot axis toward the second position is less than a second torque to pivot the first clamping member about second pivot axis toward the fourth position, and wherein the first clamping member is configured to pivot relative to the pedal body toward the sixth position about only the first pivot axis during a step-in operation of the bicycle pedal, and configured to pivot relative to the first sub member toward the fourth position about only the second pivot axis during a step-out operation of the bicycle pedal.

* * * * *